(12) United States Patent
Medina et al.

(10) Patent No.: US 11,085,656 B2
(45) Date of Patent: Aug. 10, 2021

(54) CONFIGURABLE ELECTRODE HUMIDIFIER ALLOWING FOR VARIOUS INJECTS

(71) Applicant: Ademco Inc., Golden Valley, MN (US)

(72) Inventors: David Medina, Chihuahua (MX); Michael S. Peterson, Hudson, WI (US); Cesar Alejandro Arzate, Chihuahua (MX); David J. Emmons, Plymouth, MN (US); Steven Wolff, Hamel, MN (US)

(73) Assignee: Ademco Inc., Golden Valley, MN (US)

( * ) Notice: Subject to any disclaimer, the term of this patent is extended or adjusted under 35 U.S.C. 154(b) by 532 days.

(21) Appl. No.: 15/901,726

(22) Filed: Feb. 21, 2018

(65) Prior Publication Data
US 2018/0245806 A1    Aug. 30, 2018

Related U.S. Application Data

(60) Provisional application No. 62/463,434, filed on Feb. 24, 2017.

(51) Int. Cl.
*F24F 6/02* (2006.01)
*F24F 6/18* (2006.01)
(Continued)

(52) U.S. Cl.
CPC ............... *F24F 6/025* (2013.01); *F24F 3/14* (2013.01); *F24F 6/14* (2013.01); *F24F 6/18* (2013.01);
(Continued)

(58) Field of Classification Search
CPC ...... F24F 6/025; F24F 3/14; F24F 6/18; F24F 2140/00; F24F 11/70; F24F 2006/008; F24F 6/14; Y02B 30/545
(Continued)

(56) References Cited

U.S. PATENT DOCUMENTS

| 1,542,655 A | 6/1925 | Ayres |
| 1,994,331 A | 3/1935 | Ziskin et al. |

(Continued)

FOREIGN PATENT DOCUMENTS

| CN | 203852774 U | 10/2014 |
| DE | 3405212 A1 | 7/1985 |

(Continued)

OTHER PUBLICATIONS

Innternational Preliminary Report on Patentability from counterpart International Application No. PCT/US2018/019567, dated Sep. 6, 2019, 9 pp.

(Continued)

*Primary Examiner* — Jimmy Chou
(74) *Attorney, Agent, or Firm* — Shumaker & Sieffert, P.A.

(57) ABSTRACT

An electrode humidifier device having a cartridge and a reconfigurable steam nozzle, connected to the cartridge that may be changeable between a direct and a remote mounting. Fill and drain valves on a manifold may be operated to add or drain water, respectively, in the cartridge. A sensor may indicate a water level in the cartridge. A controller may be connected to the sensor, and the fill and drain valves. A steam output capacity of the cartridge may be maintained at a predetermined magnitude by controlling the level of water with a controller. The cartridge may have one or more handles for easily inserting or removing the cartridge in a housing. The manifold may be installed in the drain pan for easier cartridge replacement. The humidifier device may be directly mounted on an air duct of a heating system or can be installed remotely.

17 Claims, 20 Drawing Sheets

(51) Int. Cl.
*F24F 6/14* (2006.01)
*F24F 3/14* (2006.01)
*F24F 140/00* (2018.01)
*F24F 6/00* (2006.01)
*F24F 11/70* (2018.01)

(52) U.S. Cl.
CPC ......... *F24F 11/70* (2018.01); *F24F 2006/008* (2013.01); *F24F 2140/00* (2018.01); *Y02B 30/54* (2013.01)

(58) Field of Classification Search
USPC ....... 392/324, 325, 326, 327, 337, 386, 387, 392/400, 401; 261/130
See application file for complete search history.

(56) References Cited

U.S. PATENT DOCUMENTS

| | | | |
|---|---|---|---|
| 2,101,603 | A | 12/1937 | Stimson |
| 2,140,516 | A | 12/1938 | Cowan |
| 2,519,515 | A | 8/1950 | Turner |
| 2,533,794 | A | 12/1950 | Hanks et al. |
| 2,587,834 | A | 3/1952 | Goode |
| 2,777,935 | A | 1/1957 | Schmitt et al. |
| 3,219,796 | A | 11/1965 | Graf et al. |
| 3,250,472 | A | 5/1966 | Smith |
| 3,289,936 | A | 12/1966 | Coburn |
| 3,319,046 | A | 5/1967 | Katzman et al. |
| 3,334,877 | A * | 8/1967 | Payne ............ F24D 5/00 261/71 |
| 3,365,181 | A | 1/1968 | Schwaneke |
| 3,491,746 | A | 1/1970 | Swimmer et al. |
| 3,523,175 | A * | 8/1970 | Gygax ............ F24F 6/025 392/402 |
| 3,570,822 | A | 3/1971 | Peterson et al. |
| 3,610,879 | A | 10/1971 | Katzman et al. |
| 3,630,378 | A | 12/1971 | Bauman |
| 3,659,078 | A | 4/1972 | Rudstrom |
| 3,660,635 | A * | 5/1972 | Liebert ............ F24H 1/00 392/387 |
| 3,672,706 | A | 6/1972 | Chilcoat |
| 3,689,037 | A | 9/1972 | Payne |
| 3,714,392 | A | 1/1973 | Katzman et al. |
| 3,726,793 | A | 4/1973 | Bray |
| 3,761,019 | A | 9/1973 | Delic |
| 3,809,374 | A | 5/1974 | Schossow |
| 3,846,295 | A | 11/1974 | Gibbs |
| 3,855,371 | A | 12/1974 | Morrow et al. |
| 3,867,485 | A | 2/1975 | Yeagle |
| 3,892,945 | A | 7/1975 | Lerner |
| 3,898,976 | A | 8/1975 | Coffman, Jr. |
| 4,028,526 | A | 6/1977 | Schossow |
| 4,031,918 | A | 6/1977 | Cagle |
| 4,054,122 | A | 10/1977 | Reed |
| 4,132,883 | A * | 1/1979 | Grime ............ A61M 16/1075 239/136 |
| 4,139,762 | A * | 2/1979 | Pohrer ............ F24F 6/18 126/113 |
| 4,155,001 | A | 5/1979 | Schossow |
| 4,158,679 | A | 6/1979 | Yeagle |
| 4,169,261 | A | 9/1979 | Alpaugh |
| D253,846 | S | 1/1980 | Morrow |
| 4,211,735 | A | 7/1980 | Berlin |
| 4,239,956 | A | 12/1980 | Morton |
| D258,609 | S | 3/1981 | Vogt |
| 4,257,389 | A | 3/1981 | Texidor et al. |
| 4,257,989 | A | 3/1981 | Nishikawa |
| 4,262,191 | A | 4/1981 | Lepper et al. |
| 4,287,407 | A | 9/1981 | Treiber et al. |
| 4,384,873 | A | 5/1983 | Herr |
| 4,463,248 | A | 7/1984 | Katzman et al. |
| D280,660 | S | 9/1985 | Muchenberger |
| D281,271 | S | 11/1985 | Meyer et al. |
| 4,559,789 | A | 12/1985 | Rick |
| 4,564,746 | A | 1/1986 | Morton et al. |
| D283,265 | S | 4/1986 | Preskey et al. |
| 4,589,409 | A | 5/1986 | Chatburn et al. |
| 4,626,346 | A | 12/1986 | Hall |
| 4,650,586 | A | 3/1987 | Ellis, III |
| 4,668,854 | A | 5/1987 | Swan |
| 4,675,505 | A | 6/1987 | Fischer |
| 4,705,936 | A | 11/1987 | Fowler |
| 4,724,104 | A | 2/1988 | Kim |
| 4,770,770 | A | 9/1988 | Regunathan et al. |
| 4,792,660 | A * | 12/1988 | Cooley ............ F22B 1/30 361/94 |
| 4,841,122 | A | 6/1989 | Marton |
| 4,869,853 | A | 9/1989 | Chen |
| 4,935,601 | A * | 6/1990 | Eaton-Williams ........ F22B 1/30 392/464 |
| 4,952,779 | A * | 8/1990 | Eaton-Williams ........ F22B 1/30 392/322 |
| RE33,414 | E | 10/1990 | Morton |
| 4,997,553 | A | 3/1991 | Clack |
| 5,024,265 | A | 6/1991 | Buchholz et al. |
| D320,072 | S | 9/1991 | Youngeberg |
| D322,122 | S | 12/1991 | Guetersloth et al. |
| 5,075,047 | A | 12/1991 | Youngeberg |
| 5,079,950 | A | 1/1992 | McKiernan et al. |
| 5,111,529 | A | 5/1992 | Glucksman |
| 5,128,035 | A | 7/1992 | Clack et al. |
| 5,140,667 | A | 8/1992 | Youngeberg |
| D338,952 | S | 8/1993 | Snow |
| 5,252,260 | A | 10/1993 | Schuman |
| 5,256,279 | A | 10/1993 | Voznick et al. |
| D342,989 | S | 1/1994 | Wallen |
| 5,278,937 | A * | 1/1994 | Alix ............ B64D 13/00 261/142 |
| 5,286,942 | A | 2/1994 | McFadden et al. |
| 5,294,197 | A | 3/1994 | Prill et al. |
| 5,313,550 | A | 5/1994 | Crosnier et al. |
| 5,317,670 | A | 5/1994 | Elia |
| 5,341,986 | A | 8/1994 | Galba et al. |
| 5,343,551 | A | 8/1994 | Glucksman |
| 5,359,692 | A * | 10/1994 | Alix ............ F22B 1/30 392/327 |
| 5,363,471 | A * | 11/1994 | Jones ............ F22B 1/30 219/483 |
| 5,406,673 | A | 4/1995 | Bradd et al. |
| 5,407,604 | A * | 4/1995 | Luffman ............ B01F 3/0407 261/4 |
| 5,425,902 | A | 6/1995 | Miller et al. |
| 5,440,668 | A * | 8/1995 | Jones ............ F22B 1/30 392/327 |
| 5,445,143 | A | 8/1995 | Sims |
| D370,254 | S | 5/1996 | Dancs et al. |
| 5,516,466 | A | 5/1996 | Schlesch et al. |
| 5,543,090 | A | 8/1996 | Morton et al. |
| 5,546,926 | A | 8/1996 | Lake |
| 5,598,971 | A | 2/1997 | Winther et al. |
| 5,620,503 | A | 4/1997 | Miller et al. |
| 5,758,018 | A | 5/1998 | Fowler, Jr. |
| 5,851,444 | A | 12/1998 | Hansell, Jr. et al. |
| 5,855,823 | A | 1/1999 | MacGibbon et al. |
| 5,880,438 | A | 3/1999 | Parrini et al. |
| 5,906,800 | A | 3/1999 | Napierkowski et al. |
| D409,737 | S | 5/1999 | Nilsson |
| 5,942,163 | A | 8/1999 | Robinson et al. |
| D416,994 | S | 11/1999 | Kensok et al. |
| 5,976,363 | A | 11/1999 | Monroe et al. |
| 6,019,820 | A | 2/2000 | Leverett |
| 6,053,482 | A | 4/2000 | Glenn et al. |
| 6,078,729 | A | 6/2000 | Kopel |
| 6,092,794 | A | 7/2000 | Reens |
| 6,103,125 | A | 8/2000 | Knepper |
| 6,120,682 | A | 9/2000 | Cook |
| 6,148,144 | A | 11/2000 | Milanese |
| 6,190,558 | B1 | 2/2001 | Robbins |
| 6,195,013 | B1 | 4/2001 | Robinson |
| 6,253,964 | B1 | 7/2001 | Rainey |
| 6,257,871 | B1 | 7/2001 | Weiss et al. |
| 6,260,514 | B1 | 7/2001 | Ehling et al. |

(56) References Cited

U.S. PATENT DOCUMENTS

| | | |
|---|---|---|
| 6,286,181 B1 | 9/2001 | Kasper et al. |
| 6,339,952 B1 | 1/2002 | Potter et al. |
| 6,354,572 B1 | 3/2002 | Menassa |
| 6,375,849 B1 | 4/2002 | Crabtree et al. |
| D456,887 S | 5/2002 | Zlotnik |
| 6,394,427 B1 | 5/2002 | Guetersloh et al. |
| 6,397,001 B1 | 5/2002 | Montagnino et al. |
| D458,356 S | 6/2002 | Redner et al. |
| 6,398,196 B1 | 6/2002 | Light et al. |
| 6,488,219 B1 | 12/2002 | Herr |
| 6,560,408 B2 | 5/2003 | Glucksman et al. |
| 6,588,734 B2 | 7/2003 | Redner et al. |
| 6,631,856 B2 | 10/2003 | Herr |
| 6,644,957 B2 | 11/2003 | Weiss |
| D486,896 S | 2/2004 | Long et al. |
| 6,684,821 B2 | 2/2004 | Lannes et al. |
| 6,715,743 B2 | 4/2004 | Zhang |
| 6,727,822 B2 | 4/2004 | Chamberlin et al. |
| D492,759 S | 7/2004 | Yoshida |
| 6,773,588 B2 | 8/2004 | Beeman et al. |
| 6,792,963 B2 | 9/2004 | Kopel |
| 6,810,732 B2 | 11/2004 | Shon |
| 6,845,755 B2 | 1/2005 | Cook et al. |
| 6,846,407 B2 | 1/2005 | Anderson et al. |
| D516,192 S | 2/2006 | Kang |
| D516,689 S | 3/2006 | Salmon et al. |
| 7,011,300 B2 | 3/2006 | Kopel et al. |
| D519,622 S | 4/2006 | Cocchi |
| 7,043,974 B2 | 5/2006 | Grossman et al. |
| 7,066,452 B2 | 6/2006 | Rotering et al. |
| 7,068,924 B2 | 6/2006 | Watanabe et al. |
| D532,497 S | 11/2006 | Engel et al. |
| D538,416 S | 3/2007 | Ediger et al. |
| D540,819 S | 4/2007 | Schmitt et al. |
| D540,929 S | 4/2007 | Kowis et al. |
| D554,246 S | 10/2007 | Seelig et al. |
| 7,281,498 B2 | 10/2007 | Besik |
| D557,784 S | 12/2007 | Stead |
| 7,389,688 B1 | 6/2008 | Vander Horst |
| D573,703 S | 7/2008 | Gosselin et al. |
| 7,434,741 B2 | 10/2008 | Helt et al. |
| D593,190 S | 5/2009 | Glass |
| 7,534,306 B2 | 5/2009 | Kopel et al. |
| D596,728 S | 7/2009 | Campbell et al. |
| D598,526 S | 8/2009 | Pitchford et al. |
| D600,252 S | 9/2009 | Yan et al. |
| 7,623,771 B2 | 11/2009 | Lentz et al. |
| 7,673,855 B2 | 3/2010 | Anderson et al. |
| 7,673,858 B2 | 3/2010 | Anderson et al. |
| 7,673,859 B2 | 3/2010 | Novotny et al. |
| 7,766,310 B2* | 8/2010 | Wolff .................. F24F 6/00 261/72.1 |
| 7,826,725 B2 | 11/2010 | Wolff et al. |
| D630,310 S | 1/2011 | Beland et al. |
| D631,145 S | 1/2011 | Beland et al. |
| 7,904,608 B2 | 3/2011 | Price |
| 8,079,575 B2 | 12/2011 | Novotny et al. |
| 8,128,069 B2 | 3/2012 | Reens |
| 8,231,112 B2 | 7/2012 | Cao et al. |
| 8,292,270 B2 | 10/2012 | Terlson et al. |
| 8,302,943 B2 | 11/2012 | Wang et al. |
| 8,376,322 B2 | 2/2013 | Hoglund |
| 8,490,951 B2 | 7/2013 | Feldstein et al. |
| 8,794,603 B2 | 8/2014 | Quam et al. |
| 8,833,739 B2 | 9/2014 | Wang et al. |
| 9,004,461 B2 | 4/2015 | Schwendinger et al. |
| 9,091,497 B2 | 7/2015 | Schwendinger et al. |
| 9,174,017 B2 | 11/2015 | Potharaju et al. |
| 9,360,261 B2 | 6/2016 | Hashimoto |
| 9,406,666 B2 | 8/2016 | Naito |
| 9,433,742 B2 | 9/2016 | Manzke et al. |
| 9,822,990 B2 | 11/2017 | Peczalski et al. |
| 2002/0100716 A1 | 8/2002 | Bosko |
| 2002/0154903 A1* | 10/2002 | Glucksman ............ F24F 6/18 392/403 |
| 2002/0163092 A1 | 11/2002 | Park et al. |
| 2003/0010117 A1 | 1/2003 | Shon |
| 2003/0230522 A1 | 12/2003 | Pavel |
| 2004/0084787 A1 | 5/2004 | Williams et al. |
| 2005/0150491 A1 | 7/2005 | Chen |
| 2005/0276582 A1* | 12/2005 | Watanabe ............ A61H 33/12 392/337 |
| 2006/0027267 A1 | 2/2006 | Fritze |
| 2006/0081271 A1* | 4/2006 | Kopel .................. F22B 7/12 134/17 |
| 2007/0257386 A1* | 11/2007 | Menassa ............... F24F 6/18 261/130 |
| 2008/0079177 A1 | 4/2008 | Schuld |
| 2008/0131103 A1* | 6/2008 | Nordmann ........... F24F 6/025 392/387 |
| 2008/0185742 A1 | 8/2008 | Novotny et al. |
| 2008/0317447 A1 | 12/2008 | Lentz et al. |
| 2009/0102072 A1* | 4/2009 | Anderson .............. F24F 6/18 261/58 |
| 2010/0247083 A1* | 9/2010 | Deutschmann ...... F22B 1/306 392/386 |
| 2011/0067851 A1 | 3/2011 | Terlson et al. |
| 2011/0068486 A1 | 3/2011 | Quam et al. |
| 2011/0068490 A1 | 3/2011 | Wang et al. |
| 2012/0097163 A1 | 4/2012 | Potharaju et al. |
| 2012/0211906 A1* | 8/2012 | Kanel .................. A61L 9/035 261/91 |
| 2013/0139996 A1 | 6/2013 | Hashimoto |
| 2014/0145359 A1* | 5/2014 | Schwendinger ...... F28G 13/00 261/141 |
| 2014/0199484 A1 | 7/2014 | Larson et al. |
| 2015/0021796 A1 | 1/2015 | Peczalski et al. |
| 2017/0134214 A1 | 5/2017 | Sethuraman et al. |
| 2018/0172298 A1* | 6/2018 | Conrad .................. F24F 6/12 |
| 2019/0032827 A1* | 1/2019 | Lotti ................... F24F 6/025 |
| 2019/0032933 A1* | 1/2019 | Guerin .................. F24F 6/12 |

FOREIGN PATENT DOCUMENTS

| | | |
|---|---|---|
| EP | 0453384 A1 | 10/1991 |
| JP | 54023240 A | 2/1979 |
| JP | 62095189 A | 5/1987 |
| JP | 63270592 A | 11/1988 |
| JP | 10034428 A | 1/1989 |
| JP | 5296505 A | 11/1993 |
| JP | 7293953 A | 11/1995 |
| JP | 11300341 A | 11/1999 |
| JP | 2003314865 A | 11/2003 |
| JP | 2004293936 A | 10/2004 |
| JP | 4124535 B2 | 7/2008 |
| JP | 2016031228 A | 3/2016 |
| WO | 2014066882 A1 | 5/2014 |

OTHER PUBLICATIONS

"Installation Instructions for the Programmable Humidifier Automatic Flushing Timer," 2 pages, prior to Jan. 15, 2010.

"Photograph of Remote Nozzle for Elite Steam Humidifier, Manufactured by GeneralAire," 1 page, Sep. 25, 2006.

"Pictures of Hayward Universal StopCock Valves," 3 pages, Oct. 29, 2007.

AB SIBE International, "Pure Water for Air Humidification Systems," 1 page, 1999.

Aprilaire, "Humidifiers, Owner's Manual for Models 110, 112, 220, 224, 350, 360, 440, 445, 448, 558, 560, 568, 760, and 768," 20 pages, Feb. 2005.

Aprilaire, "Humidifiers, Owner's Manual for Models 350, 360, 400, 400M, 500, 500M, 600, 600M, 700, and 700M," 11 pages, Jun. 2010.

Aprilaire, "Model 800 Residential Steam Humidifier, Installation and Maintenance Instructions," 16 pages, May 2010.

Armstrong, "HumidiClean Series HC-4000 Humidifier," 10 pages, Oct. 1999.

AutoFlo, "Electronics Steam Unit-Power Humidifier Models S2000 and S2020 Installation Instructions and Owner's Manual," 11 pages, prior to Aug. 7, 2003.

(56) References Cited

OTHER PUBLICATIONS

AutoFlo, "Electronics Steam Unit-Power Humidifier Models S2000 and S2020 Installation Instructions and Owner's Manual," 12 pages, 1999-2003.
Carel USA, "HomeSteam Elite Residential Whole House Humidifier," downloaded from http://www.carelusa.com/homesteam.htm, 3 pages, printed Jul. 25, 2003.
Carel, "HomeSteam Elite Residential Steam Humidifier, Installation, Operating, and Maintenance Manual," 24 pages, prior to Aug. 7, 2003.
Carel, "HumiSteam X-Plus, Steam Humidifiers, User Manual," 60 pages, Mar. 16, 2011.
Carrier, "Humidifiers, Homeowner's Manual," 8 pages, 1998.
Dristeem, "XT Series Electrode Steam Humidifier, Installation, Operation, and Maintenance Manual," 72 pages, 2009.
GeneralAire, "Elite Steam Residential Steam Humidifiers, User Manual," 28 pages, prior to Oct. 11, 2007.
GeneralAire, "Model Elite Steam Humidifiers, User Manual," Revision 4.0, 48 pages, Mar. 2, 2015.
Hayward Flow Control Systems, "Control Valves," 2 pages, prior to Oct. 31, 2007.
Honeywell, "HE225 ByPass Flow-Through Humidifier," 8 pages, Jun. 2010.
Honeywell, "HE360 Powered Flow-Through Humidifier, Owner's Guide," 8 pages, 1997.
Honeywell, "HE420A,B and HE460A,B Steam Power Humidifiers, Product Data," 12 pages, 1998.
Honeywell, "HM700A1000 Electrode Steam Humidifier, Installation Instructions," 28 pages, Nov. 2015.
Honeywell, "The Best Humidifier Available," 2 pages, prior to Aug. 7, 2003.
http://www.ewccontrols.com/steam_humidifier.htm, "Steam Humidifier, Models S2000, and S2020," 2 pages, May 3, 2006.
http://www.michiganair.com/newsletters/2011-1/section3.htm, "Tis the Season to Humidify," 4 pages, printed Oct. 12, 2012.
http://www.powerspecialties.com/humidiclean.htm, "HumidiClean Humidifier, The Ionic Bed. The Final Resting Place for Ordinary Humidifiers," 1 page, printed Nov. 23, 2002.
http://www.powerspecialties.com/humidiclean_specifcat.htm, "Humidiclean Suggested Specifications," 4 pages, prior to Aug. 7, 2003.
http://www.skuttle.com/f601.html, "Skuttle Model 60 Humidifier Flushing Timer," 2 pages, printed May 3, 2006.
Humidity Source, "ElectroVap MC2, Electrode Steam Humidifier, Technical Manual," 49 pages, downloaded Nov. 23, 2016.
JS Humidifiers PLC, "Condair Mk5 Resistive Steam Humidifier," 4 pages, prior to Oct. 12, 2012.
JS, "Calomax Steam Humidifier Range," 2 pages, Jul. 2002.
JS, "PureFlo Water Treatment for Humidifiers," 2 pages, prior to Feb. 24, 2017.
Marshall-George, "Electrode vs Resistive Steam Humidifiers," downloaded from http://www.condair.co.uk/knowledge-hub/electrode-vs-resistive-humidifiers, 5 pages, printed Nov. 23, 2016.
Nortec, "NH-EL Series Engineering Manual," 59 pages, May 2014.
Nortec, "NHRS Series Resistive Element Steam Humidifier, Engineering Manual," Manual No. H-104, 26 pages, Feb. 18, 2008.
Nortec, "Nortec's GS Series, Condensing High Efficiency," 8 pages, prior to Aug. 7, 2003.
Nortec, "RH Series," 2 pages, downloaded Nov. 23, 2016.
Omega Engineering, "New Conductivity Level Switches," 5 pages, prior to Oct. 18, 2007.
Pure Humidifier, "Standard Water EC Series Electric Humidifier, Installation Instructions, Operation and Maintenance Manual," 24 pages, Jul. 13, 2015.
Skuttle Indoor Air Quality Products, "Model 60-Series High-Capacity Steam Humidifiers (Models 60-1, F60-1, 60-2 and F60-2)," 14 pages, prior to Aug. 7, 2003.
Standex Electronics, "Fluid Level Proximity, and Motion Sensors," 16 pages, prior to Oct. 18, 2007.
Standex Electronics, "LS300 Series—Conductive Fluid Level Sensor," Preliminary Data Sheet 2003, 2 pages, printed Oct. 18, 2007.
"Electronics Control," Damper Diagrams, 1 page, downloaded 2018.
"Architecture for Synchronous Boost Converter from Vtp to Charging 1F with 1v," 11 pages, downloaded 2018.
"Ethical Milli-Damper MVG- F6," Donnelley Electronics, 2 pages, downloaded 2018.
"Bissell ProHeat Pro-Tech User's Guide," 7920/7901 Series 8915/8910 Series Jul. 2003, pp. 1-24.
"Heatersteam Electric Element Steam Humidifiers Installation and Maintenance Manual," Carel, 50 pages, 2007.
Hue Design Studio, "Comfortmist Cyclone, Aesthetic Model Color, Finish & Material Guide," Revision 01, 8 pages, Sep. 14, 2016.
Hue Design Studio, "Comfortmist Pill, Aesthetic Model Color, Finish & Material Guide," Revision 01, 9 pages, Sep. 14, 2016.
Hue Design Studio, "Comfort Mist Models," CMF Revision 01, 9 pages, Sep. 14, 2016.
Standex Electronics, "LS100 Series—Conductive Fluid Level Sensor," www.standexelectronics.com, Unknown, 1 pg.
International Search Report and Written Opinion for PCT Application No. PCT/US2018/019567, dated May 4, 2018.

\* cited by examiner

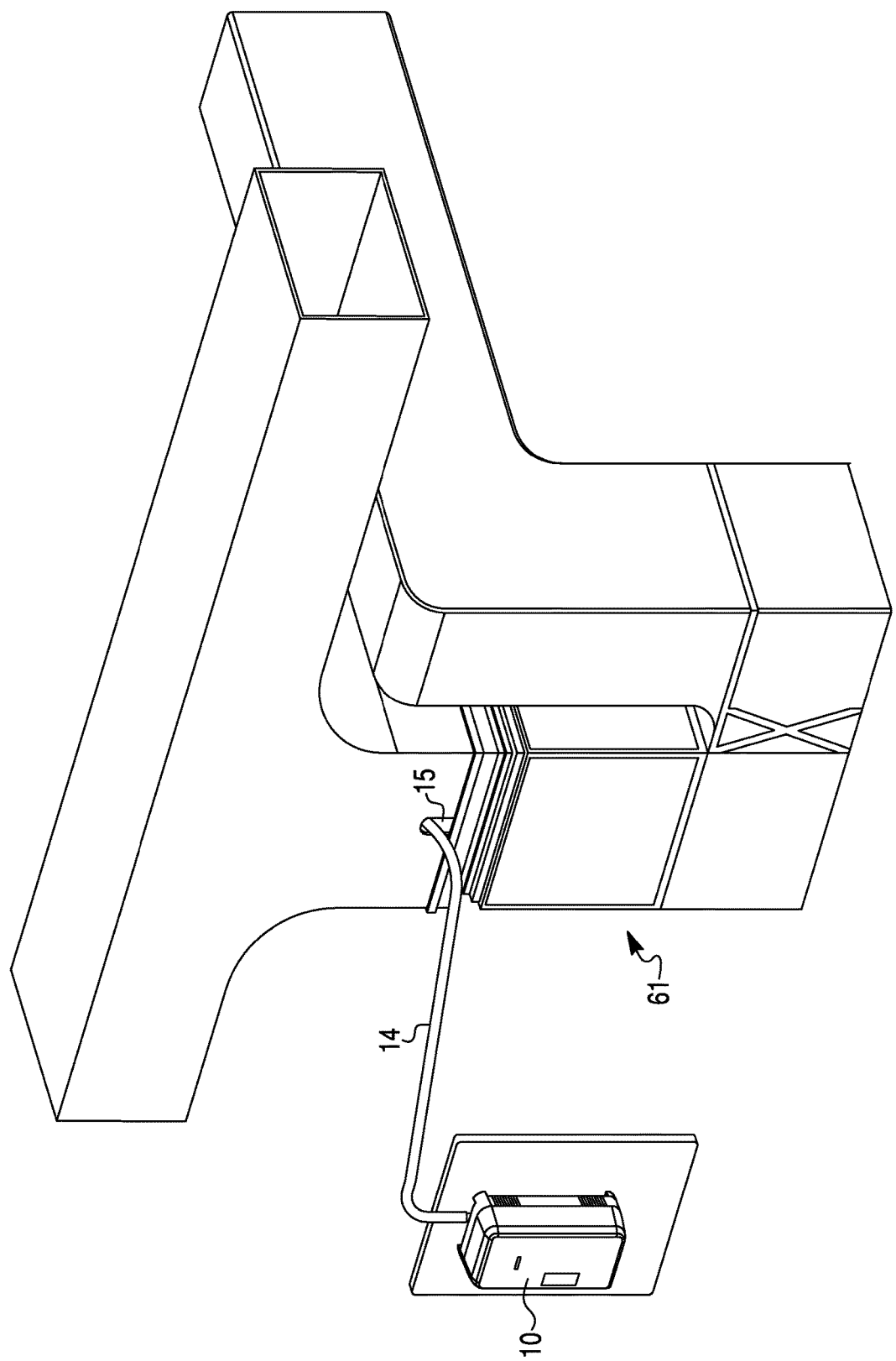

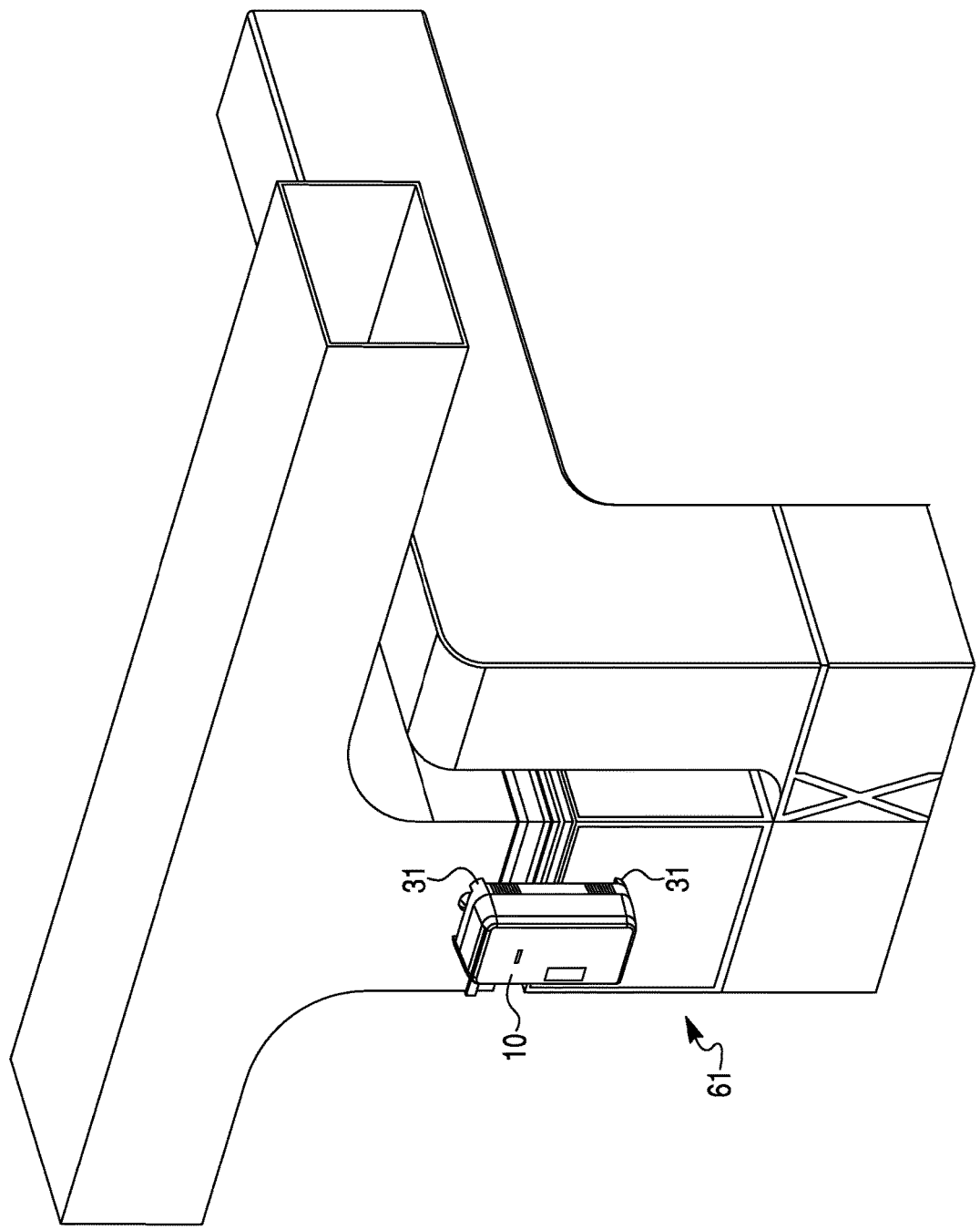

CONFIGURABLE ELECTRODE HUMIDIFIER ALLOWING FOR VARIOUS INJECTS

The present application claims the benefit of U.S. Provisional Application No. 62/463,434, filed Feb. 24, 2017. U.S. Provisional Application No. 62/463,434, filed Feb. 24, 2017, is hereby incorporated by reference.

BACKGROUND

The present disclosure pertains to humidifiers and particularly to electrode humidifiers.

SUMMARY

The disclosure reveals an electrode humidifier device with an insert-able cartridge with two or more electrodes for converting water in the cartridge into steam. A reconfigurable steam nozzle may be connected to the cartridge. The nozzle may be changeable depending of the type of installation desired; a direct mounting or a remote mounting. A fill valve may operate to add water to the cartridge. A water level sensor may indicate a level of water in the cartridge. A controller may be connected to the water level sensor, and the fill and drain valves. A steam output capacity of the cartridge may be maintained at a predetermined magnitude by controlling the level of water with the controller. The cartridge may have one or more handles for easily removing or reinserting the cartridge in the main body. A rotatable manifold may be installed in the drain pan for an easier cartridge replacement. The fill and drain valves may be connected to the manifold. The humidifier device may be directly mounted with a direct nozzle in an air duct of a heating system or can be installed remotely with a hose connection to a remote nozzle.

BRIEF DESCRIPTION OF THE DRAWING

FIGS. 13*a*, 13*b* and 13*c* are diagrams of a humidifier having a hose connected from the humidifier to a nozzle in a duct; and FIGS. 14*a*, 14*b* and 14*c* are diagrams of a humidifier attached to the duct with a direct nozzle in the duct.

DESCRIPTION

Figure 1:
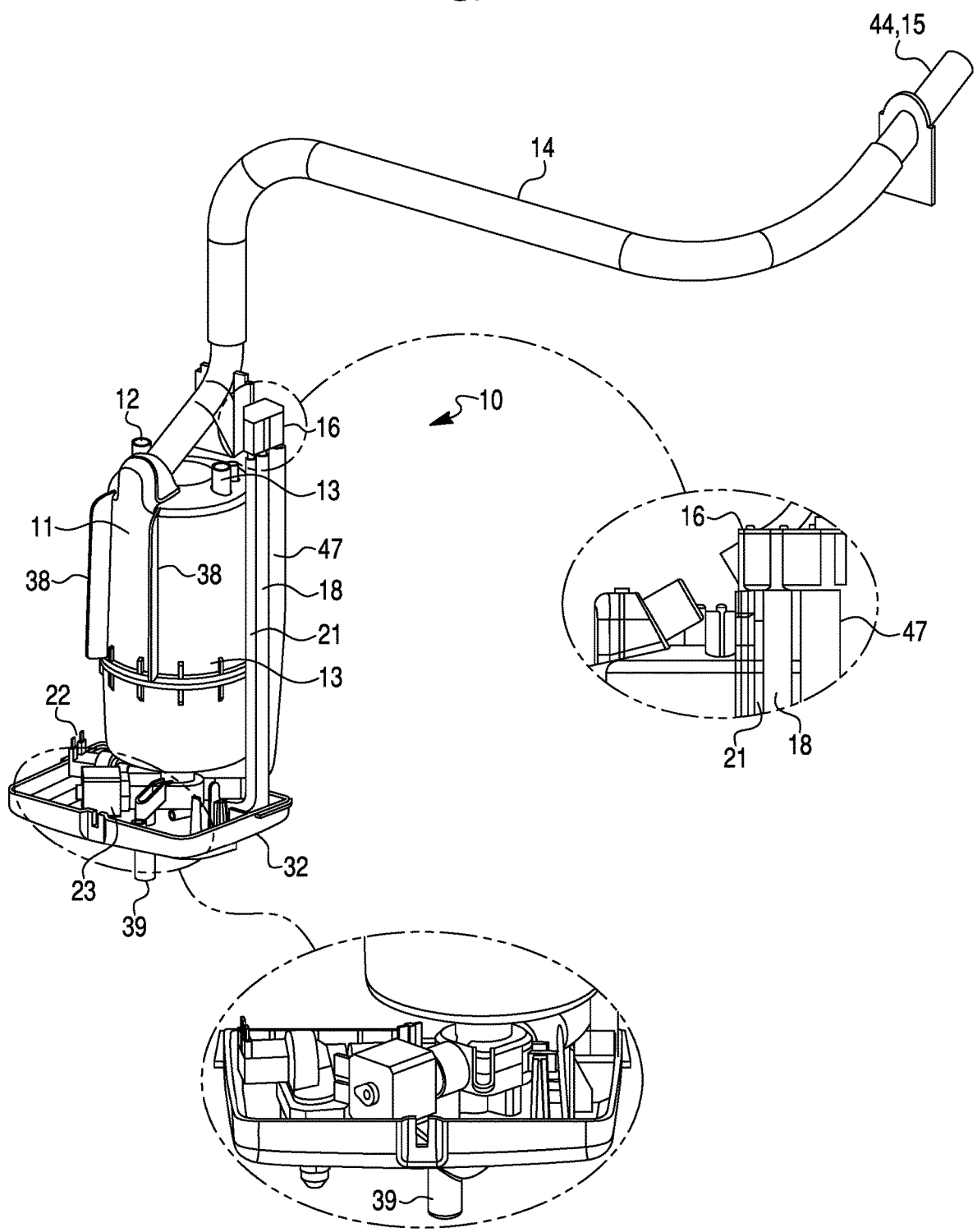
FIG. 1 is a diagram of a humidifier.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

The electrode steam humidifiers that are currently in the market do not necessarily have the configuration for direct mounting installation (i.e., not direct injection), the only possible way may be a remote mount leading to longer installation time due to the routing and mounting the remote hose and other equipment.

The present humidifier design may offer to customer a reconfigurable inject nozzle (depending on the type of mounting wanted direct or remote), standoffs in the back cover design to assure an optimal installation in the ducts; a final product packed fully configured and ready to be installed by a contractor, a drain valve that is able to rotate to assure the rotation of manifold, and a drain pan design that includes valve holders, snaps and fixtures for an easy installation and replacement of valves and a manifold that allows for its rotation during cartridge replacement.

A complete electrode steam humidifier may be available for mounting directly in the ducts (i.e., direct injection). The nozzle for direct injection might have the necessary angle to an optimal steam distribution device, and also the back cover may allow a correct installation providing standoffs in the design. However, the present design may be configurable, and thus the nozzle can be changed to have a remote mounting.

A configurable electrode humidifier may allow for direct and remote injection. The actual electrode humidifiers that are in the market do not necessarily have a configuration for direct mounting installation; the only possible way may be a remote installation. The complete device may be installed on a vertical surface near the ducts (i.e., remote installation). It might be needed to implement a configurable way to mount the humidifier, and if possible, to include both configurations in the same package in order to provide more options for customers.

FIG. 1 is a diagram of a humidifier 10. There may be a cylinder or cartridge 11 that holds water. Electrodes 12 and 13 may be in cylinder or cartridge 11 to heat water in cylinder or cartridge 11. Steam may flow through a direct nozzle 44, 15 for direct mounting, and in case of a remote installation, steam may flow through a steam line 14 to direct steam nozzle 44. There may be a fill cup 16 installed to distribute the inlet water to the cylinder or cartridge 11. Cylinder or cartridge 11 may have a water level sensor 26. There may be an over flow hose 21, a fill hose (fill cup) 18, and a fill hose (manifold) 47 connected to cylinder or cartridge 11 via a manifold 46 and fill valve 22. There may be a drain valve 23 installed at manifold 46. There may be a drain outlet 39 connected to drain pan 32.

Figure 2:
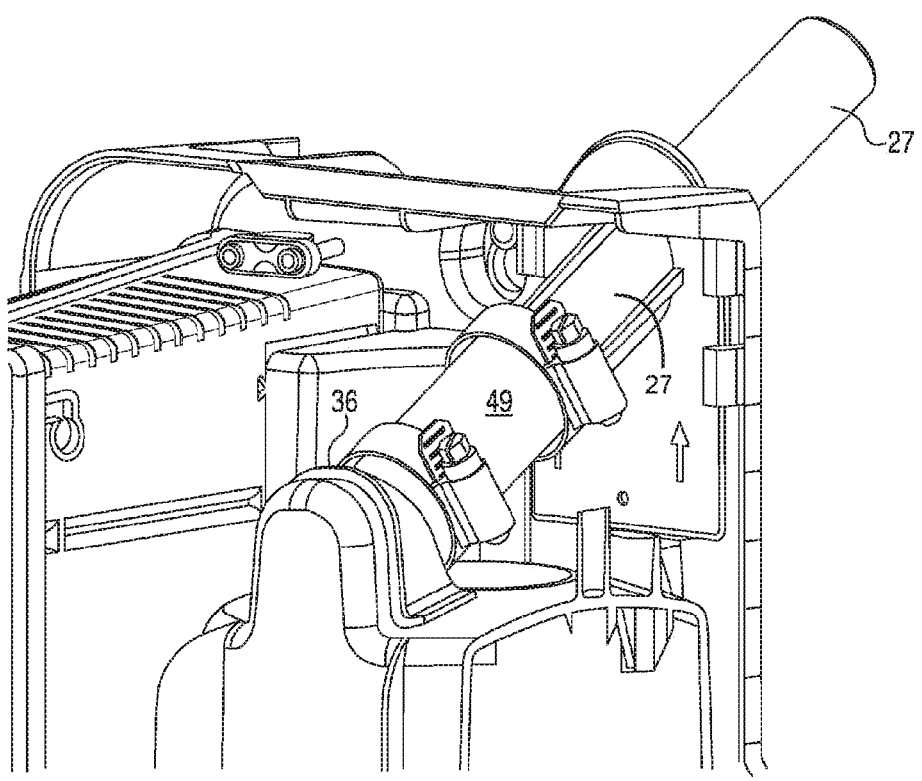
FIG. 2 is a diagram of a humidifier configuration having a direct nozzle.
Figure 3:
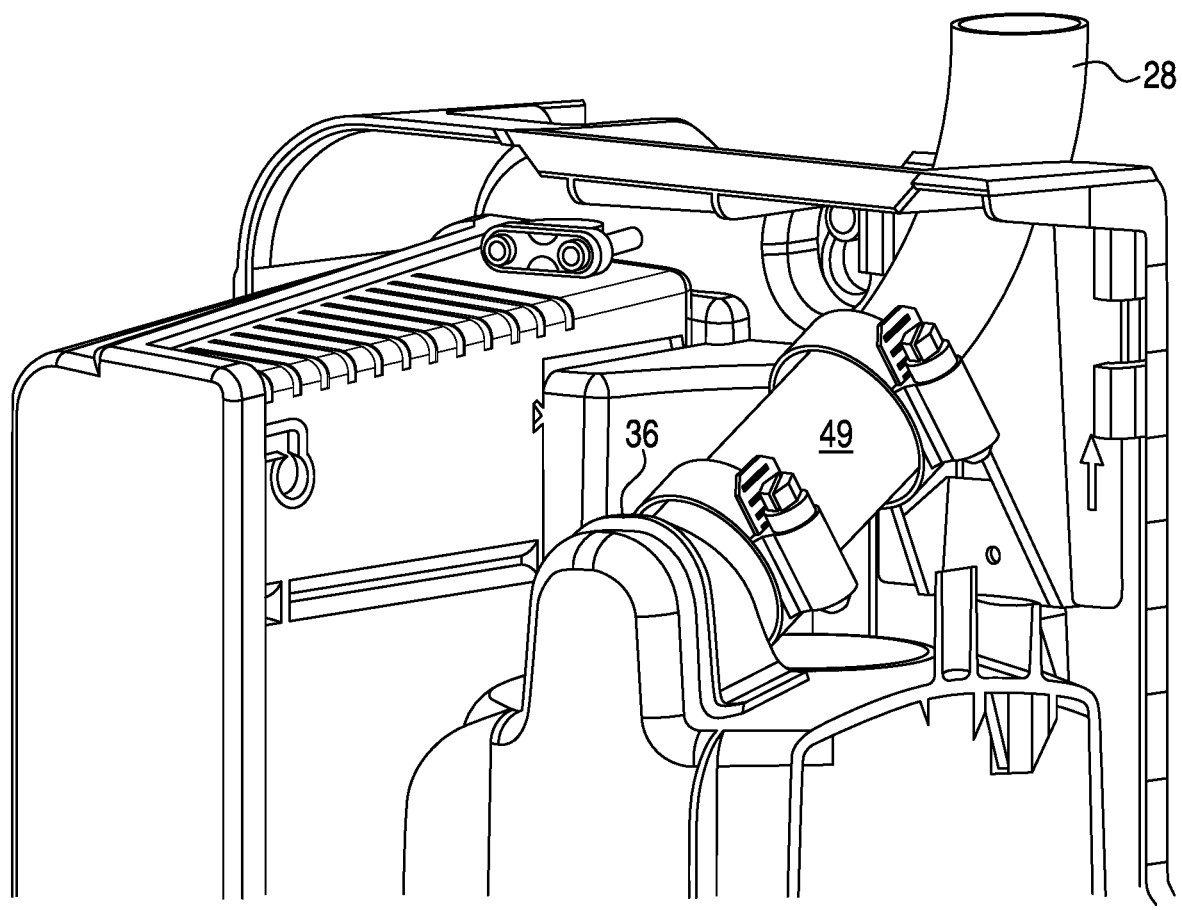
FIG. 3 is a diagram of a humidifier configuration having a curved nozzle for a remote connection.

Inject nozzle 44 may be reconfigurable. Humidifier 10 may be used with at least two different types of nozzles (depending on the type of mounting wanted, whether direct in FIG. 2 or remote in FIG. 3) including in the package a standard attachment with the back cover at an angle to connect a hose to the cartridge. The configuration may have a remote nozzle 28 of FIG. 3 by default, so a contractor can install the corresponding hose to complete the remote installation; however, if the installation needs to be direct, the contractor may change easily to a direct nozzle 27 of FIG. 2. Nozzle 27 or nozzle 28 may be connected via a short hose 49 to an outlet or output 36 of a tank, cylinder, canister or cartridge 11 or 35.

Figure 4:
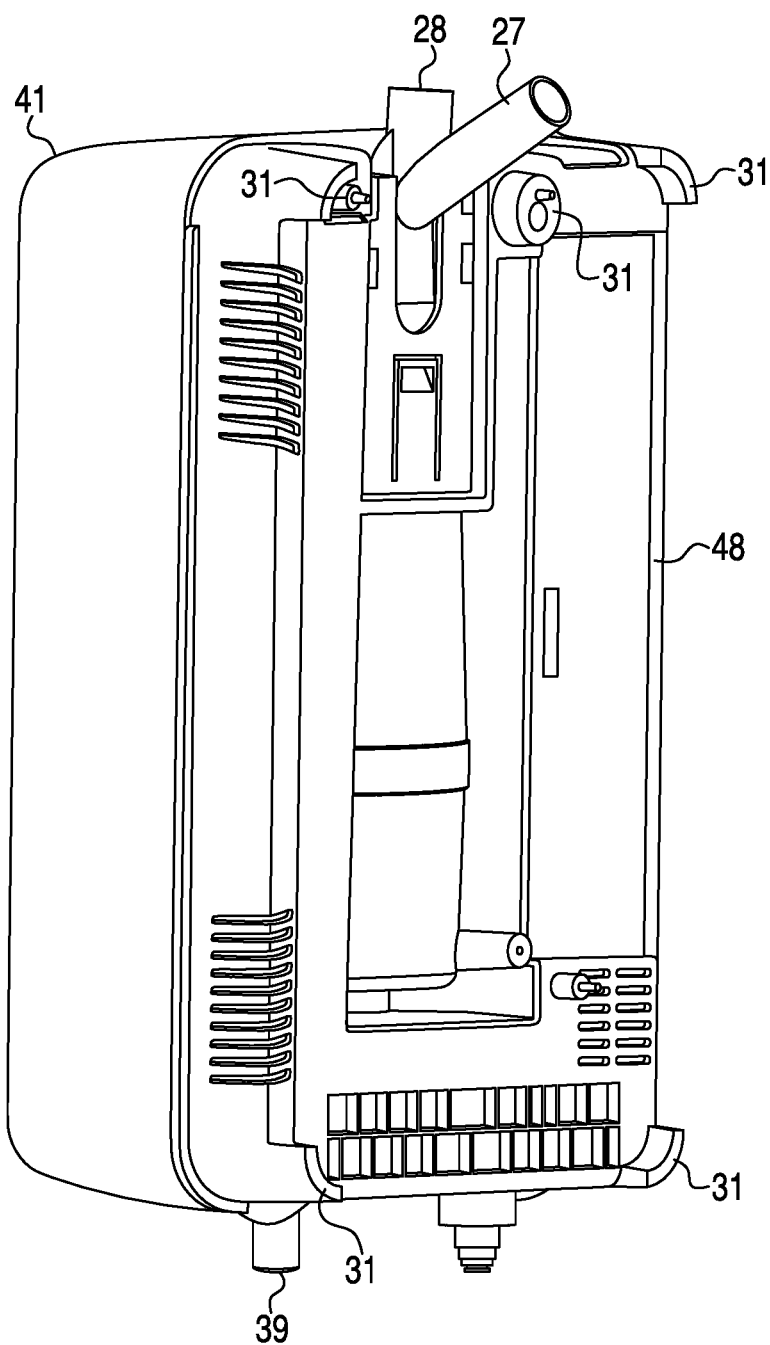
FIG. 4 is a diagram of stand-off design in the back cover of the humidifier.

A stand-off design may be noted in a diagram of FIG. 4. A back cover 48 design may include a stand-off or stand-offs 31 in order to assure an optimal installation between the humidifier and the ducts. This may assure that there will not be interference between any metallic part (e.g., metallic joints in the duct parts) facilitating the installation, and also reduce significantly heat transfer between the device and ducts. Also, there may be a front housing 41.

Figure 5:
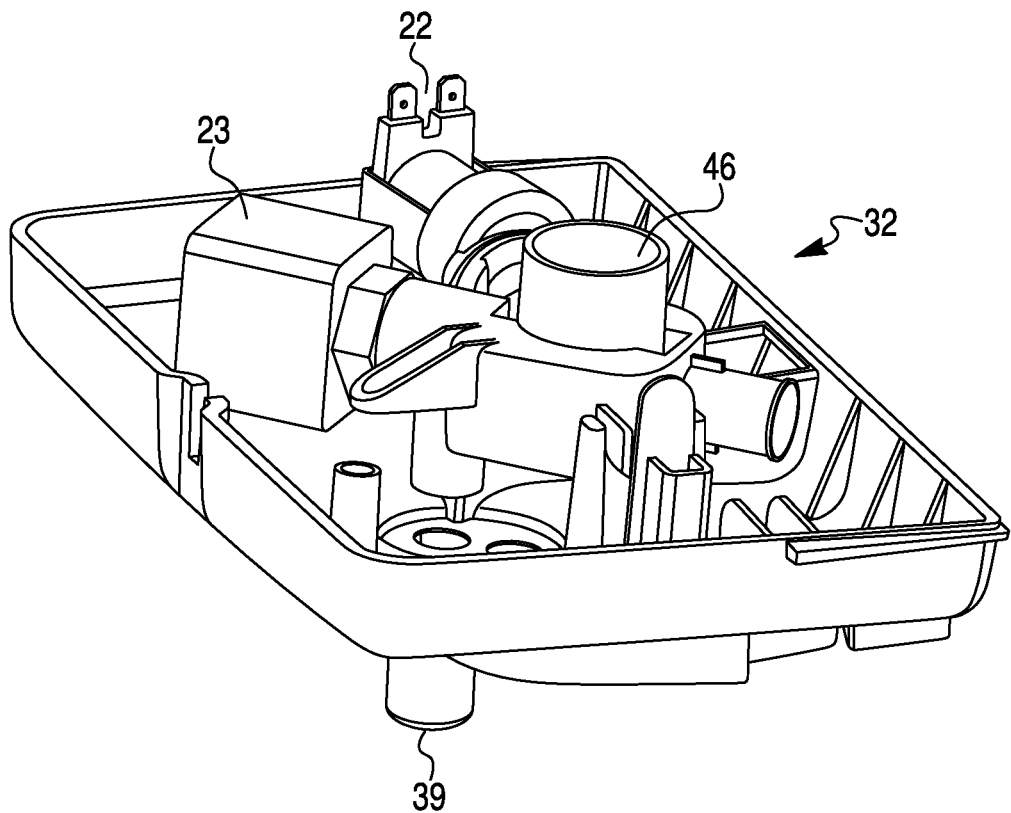
FIG. 5 is a diagram of a drain valve assembly incorporated in the humidifier.
Figure 5A:
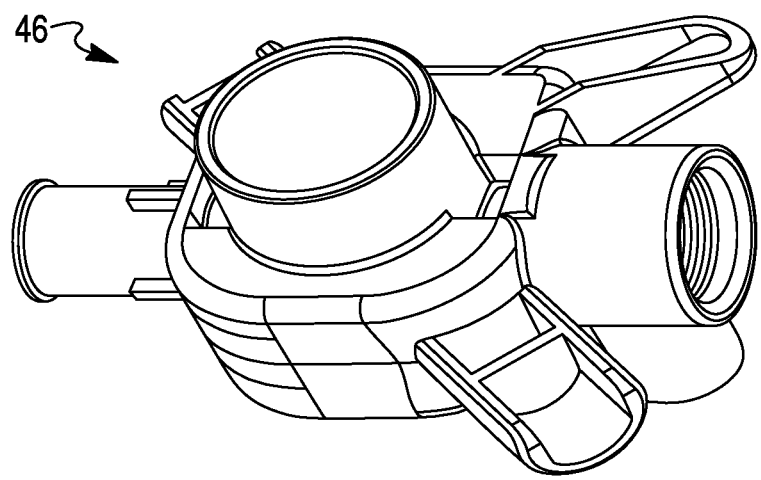
FIG. 5*a* is a diagram of a manifold for being situated in the drain pan assembly.

A rotating manifold 46 may be incorporated in humidifier 10. A drain valve 23 may be situated in drain pan 32 as in FIG. 5. In order to assure a rotation of the manifold 46 of FIG. 5*a*, for a correct replacement of a cartridge 11, the drain valve 23 may be able to rotate along with manifold 46. The drain pan 32 design may also include fill valve 22 connected to manifold 46, and manifold holders to assure an easy installation. Drain pan 32 may also have the appropriate mechanical stops and snaps to allow a free rotation or tilting of the tank, cylinder, canister or cartridge 11 for an easy installation or removal of the tank, cylinder, canister or cartridge 11 or 35. Fill valve 22 and drain valve 23 may be connected to manifold 46 via short hoses that are flexible enough to permit rotation of manifold 46 relative to the drain pan 32. If there is an attachment of the manifold to the drain pan 32, the attachment may be likewise flexible enough to permit rotation of manifold 46 relative to the drain pan 32.

Figure 6:
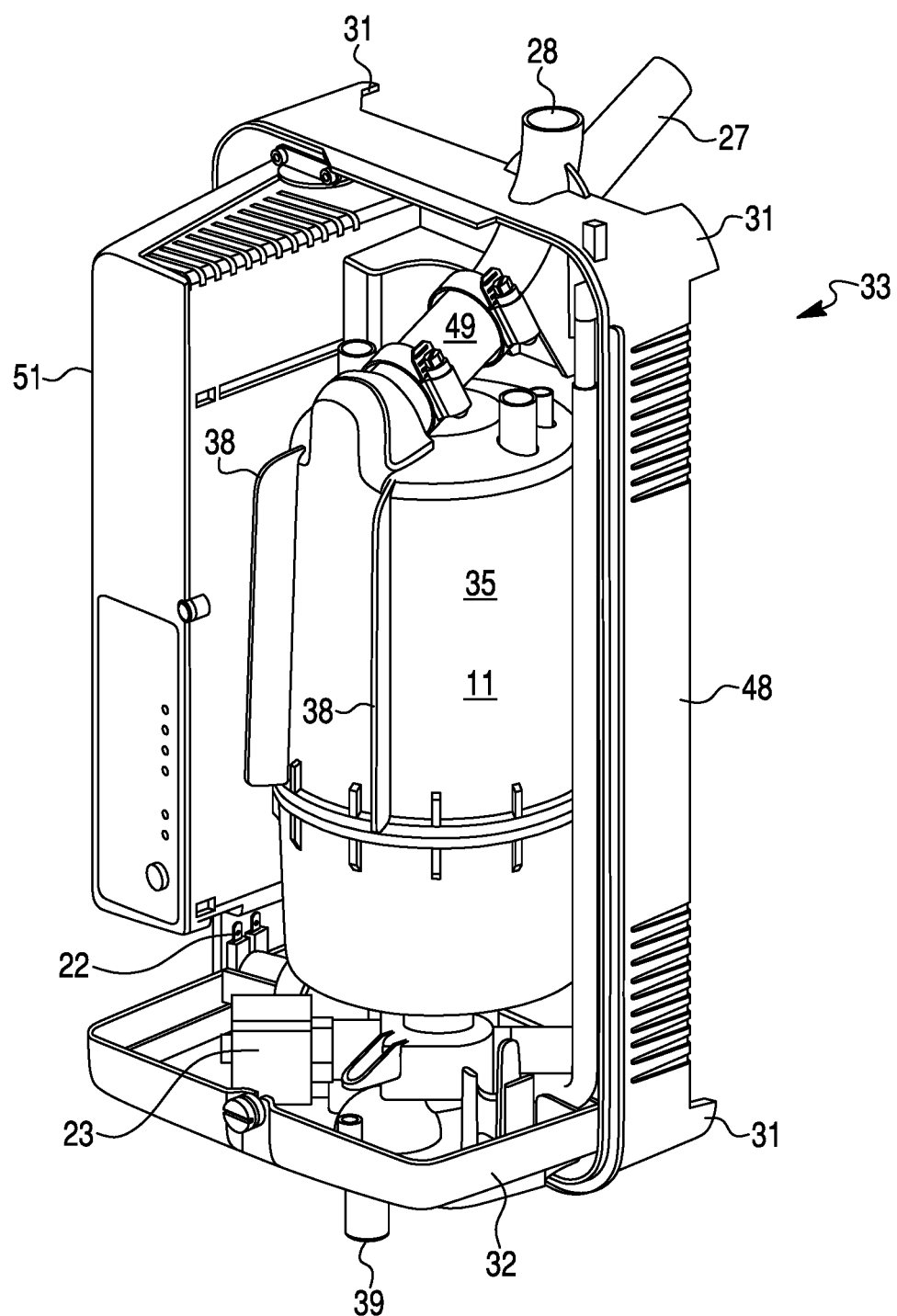
FIG. 6 is a diagram a humidifier as product packed as fully configured.

The humidifier product 33 may be packed fully configured, as in FIG. 6, ready to be installed by a contractor. The parts may incorporate a cartridge 35, 11 installed, a spout installed (with a hose attachment), electrode wires installed, a level sensor wire attached, salt in cartridge 35, 11 (if selected by the contractor), and a remote nozzle installed. Component 51 may incorporate electronics, indicators, connections, switch controls, processor, electrical connections, communications, power, and so forth, for electrode steam humidifier 10.

Figure 7:
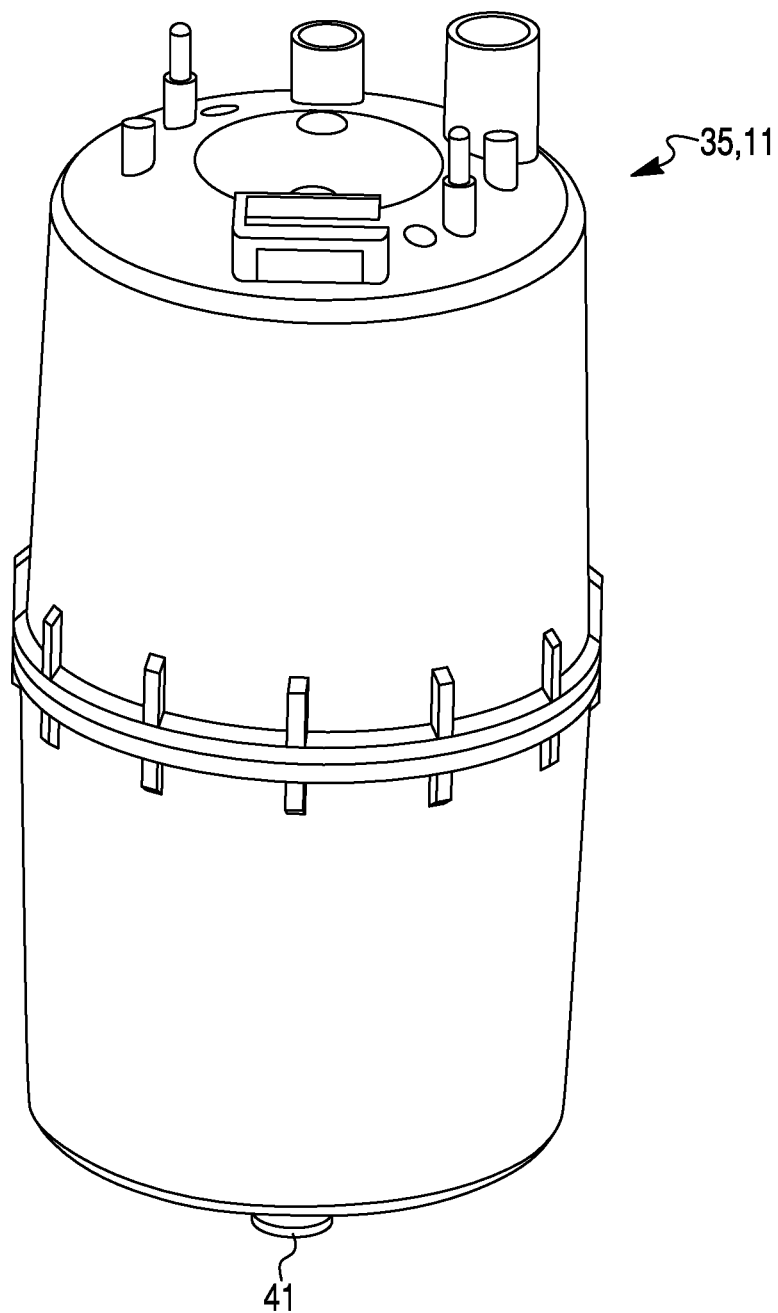
FIG. 7 is a diagram of a cylinder or cartridge for the electrode humidifier.

Electrode humidifier 33 with an improved cartridge interface may be noted. As one of the most important parts of an electrode humidifier 33 may be a cylinder or cartridge 11, 35 in FIG. 7; due to the boiling process that may be performed in an interior of the cylinder or cartridge 11, 35; the cartridge may also work as a cylinder or container 11, 35 of the supplied water (for continuous operation) and as a support for mounting electrodes 12 and 13 and a water level sensor 26 (FIG. 1).

For the nature of an operation of the cartridge 35, 11 over time, minerals in the water may adhere to the cartridge electrodes 12 and 13 reducing its life. In this process, humidifier 10 may automatically fill to a higher water level to maintain full capacity; however, eventually due to scale formation, it might no longer be necessarily possible for humidifier 10 to reach its full capacity and cartridge or cylinder 11, 35 may have to be replaced.

Many other devices do not necessarily have an intuitive and easy way to replace cartridge 35, 11. It might appear necessary to implement a new cartridge interface to permit homeowner's cylinder or canister change to be quick and intuitive.

The steam outlet of cartridge 35, 11 used in the actual design of the humidifier may have a vertical orientation; thus, this installation should be done with a normal orientation with respect the manifold (main body), after cartridge 35, 11 is in place, a hose may be attached. Disadvantages may be as in the following. The needed space (room) to allow the installation may need to be large due the contractor handling, such as by increasing the total height of humidifier 10. The cartridge 35, 11 change may be difficult for the position that the cartridge needs to have. It may take much force to remove the cartridge. Also, the cartridge change is not necessarily intuitive.

Figure 8A:
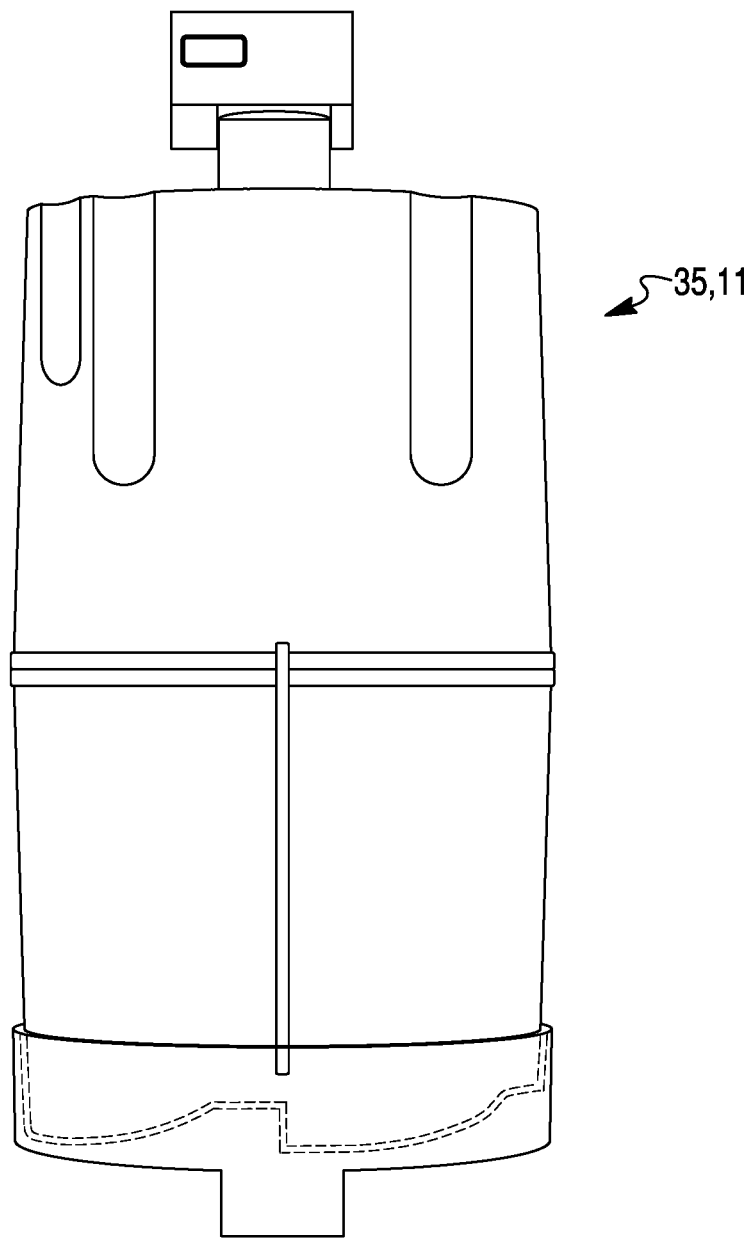
FIGS. 8*a* and 8*b* are diagrams of a twist and lift approach for removing and inserting a cylinder or cartridge for the electrode humidifier.
Figure 8B:
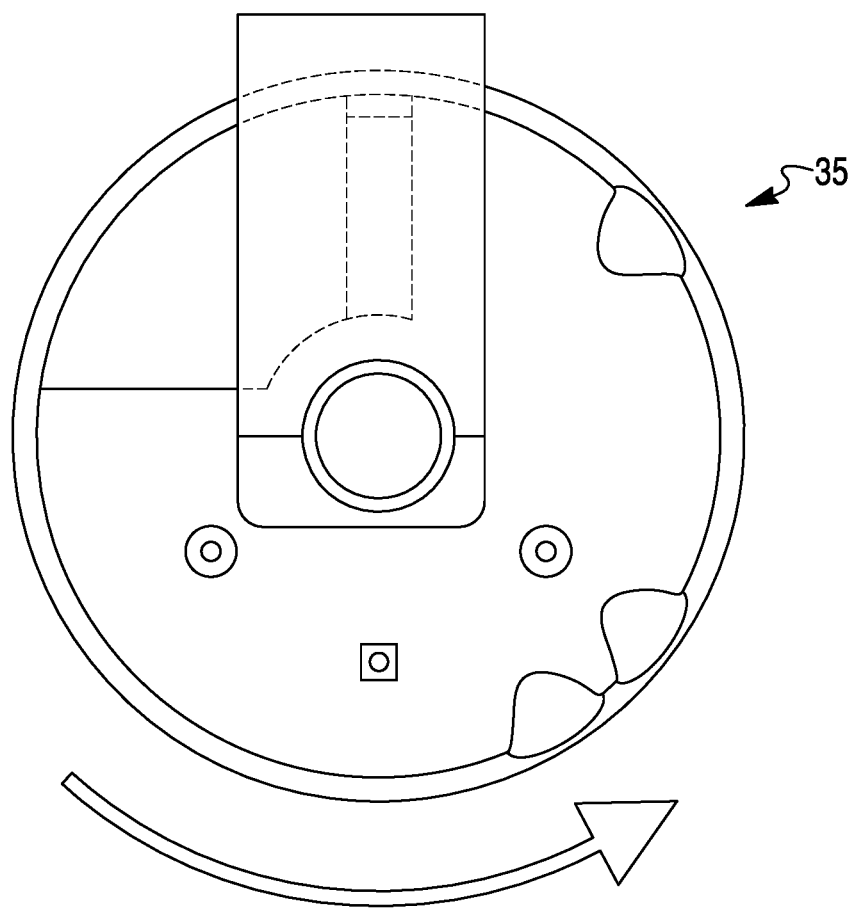

One solution that may be a twist and lift approach as shown in FIG. 8*a* and FIG. 8*b*, respectively. It may consist of ramps in the cartridge bottom in order to twist it changing a rotary movement to a vertical lineal displacement.

Figure 9:
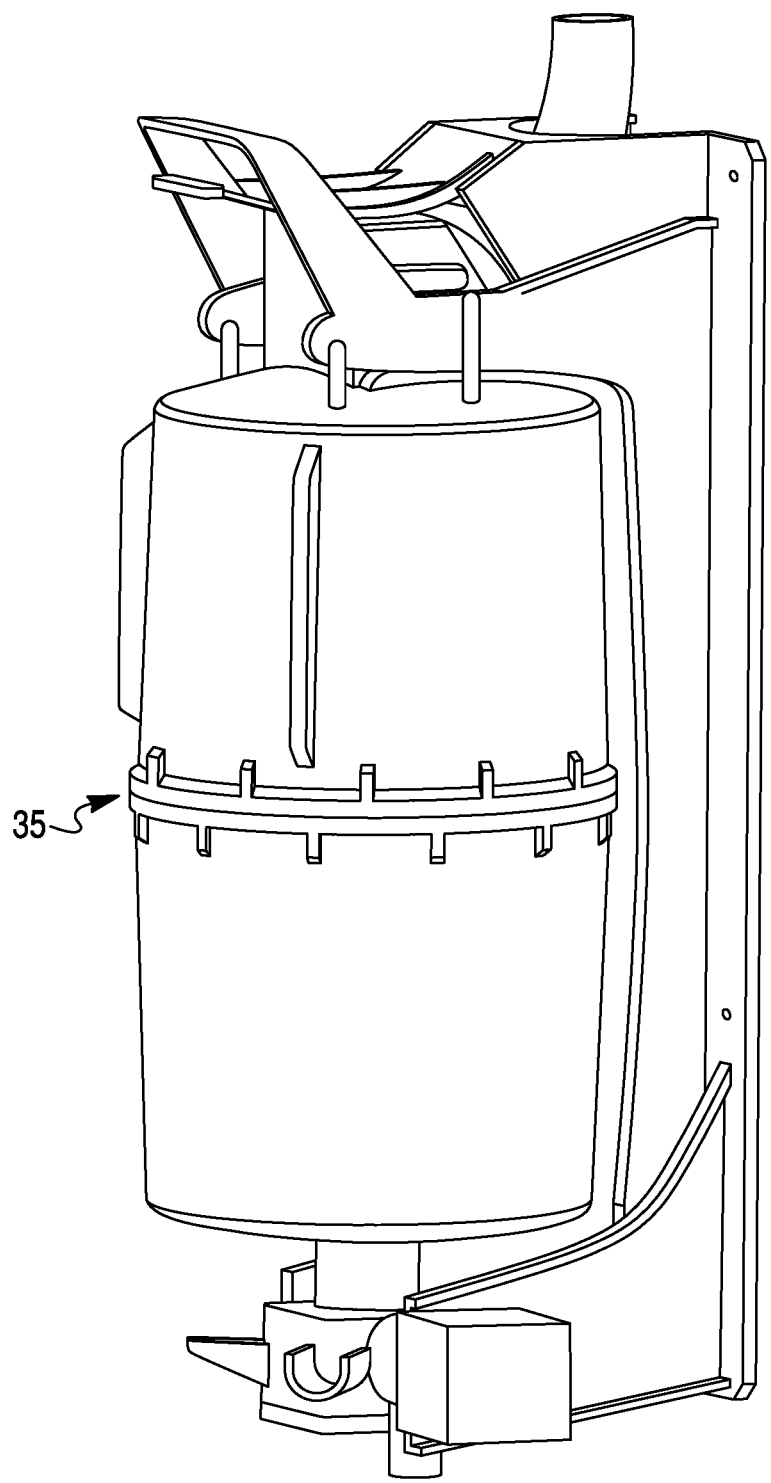
FIG. 9 is a diagram of a snap approach to attach a steam outlet with a push-click that may include an angled turn of a manifold in order to co-locate cartridge with an inclination.

Another approach may be a snap concept to attach a steam outlet with a push-click. This approach in FIG. 9 may include an angled turn of the manifold in order to co-locate cartridge 35 with an inclination in a first assembly. After the turning until final position, the attached may be done by a snap, and an O-ring in the steam outlet may be included to avoid leaks.

Figure 10:
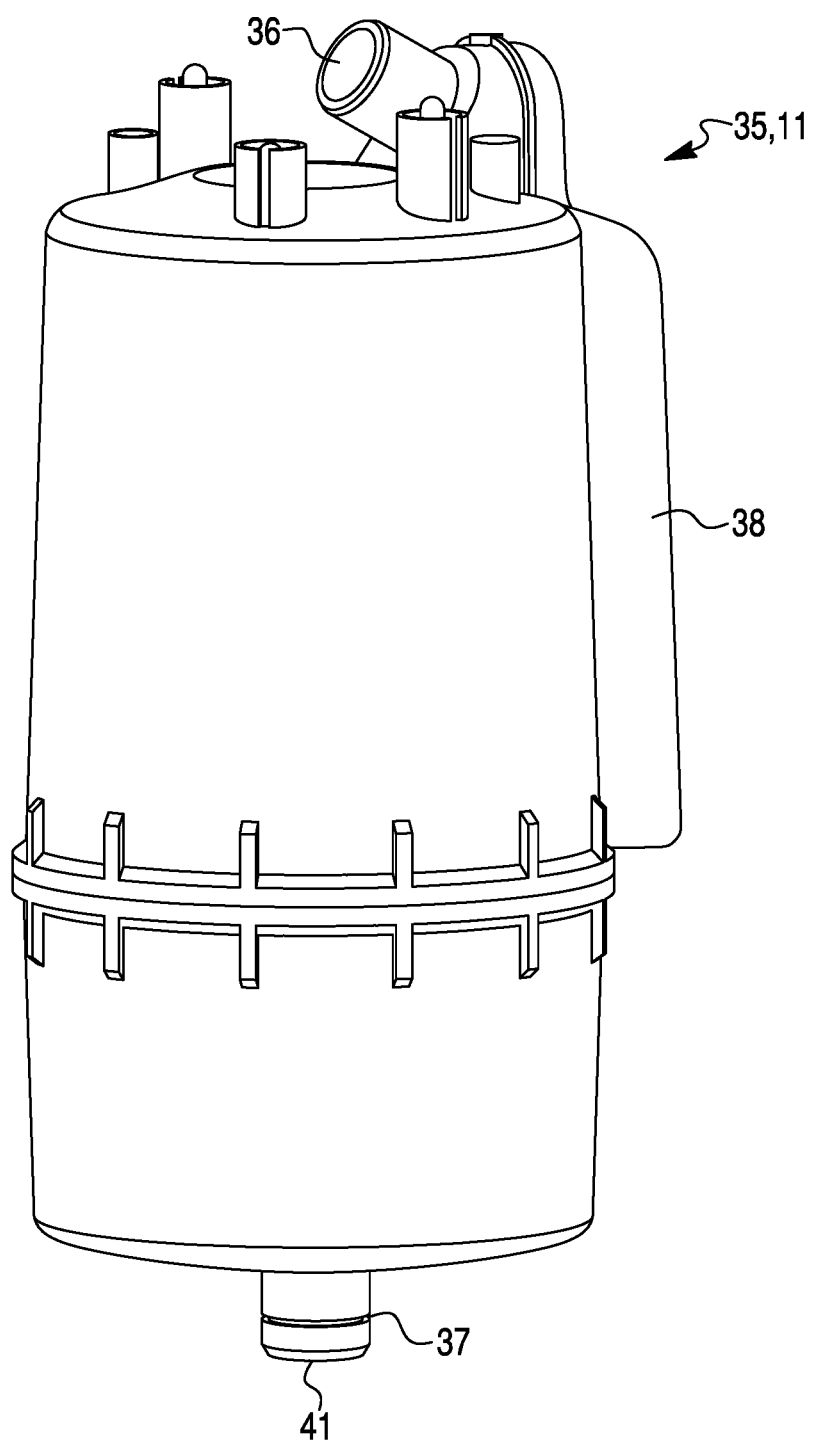
FIGS. 10 and 11 are diagrams of the cartridge geometry, a bottom entry is situated in the manifold that may move through enough angle in order to get a cartridge inclination during replacement, and at the same time the steam outlet may have an angle in order to be installed with a direct connection to a steam nozzle or remote connection with a flexible hose that connects the steam nozzle.
Figure 11:
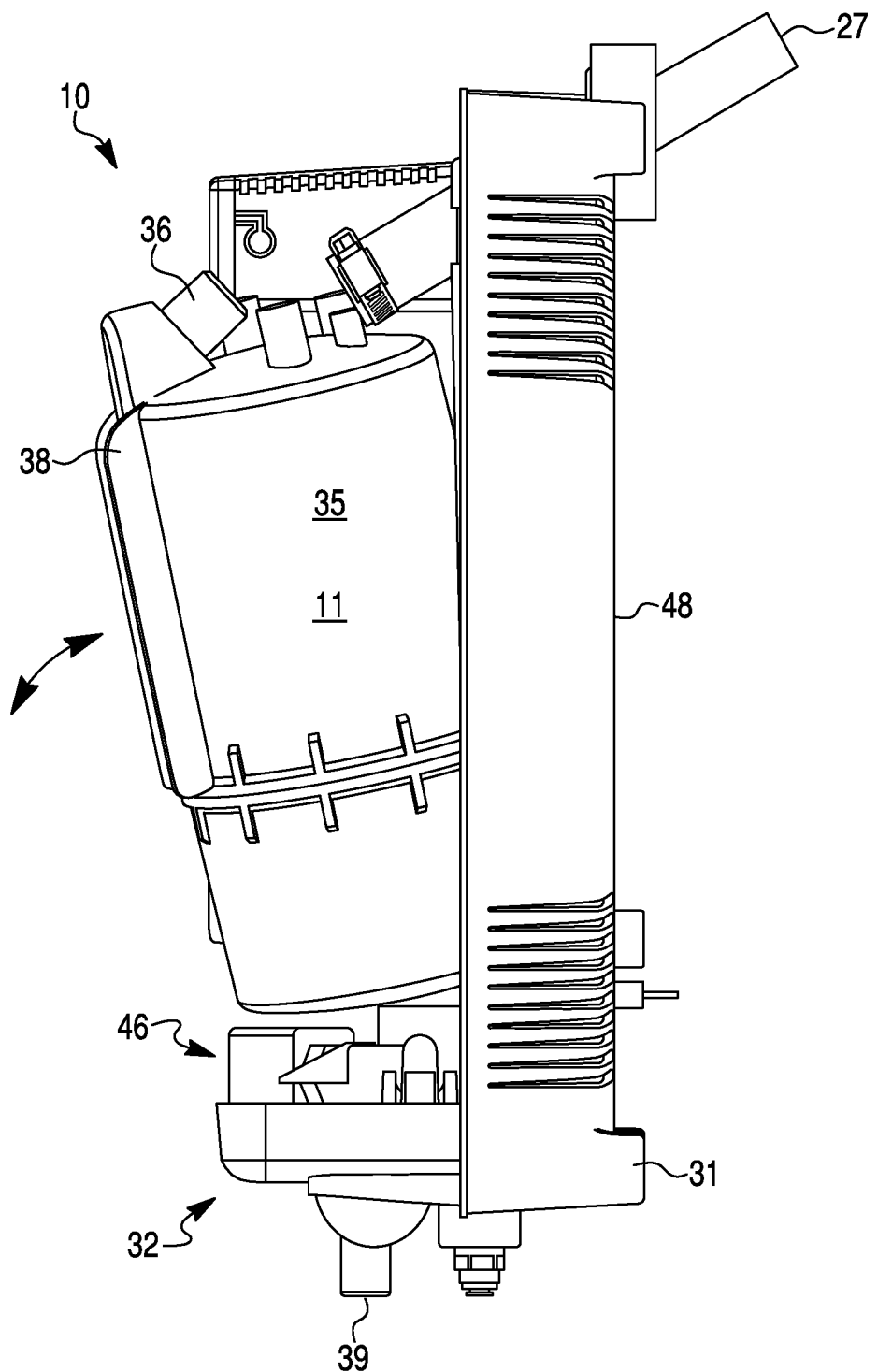
Figure 12:
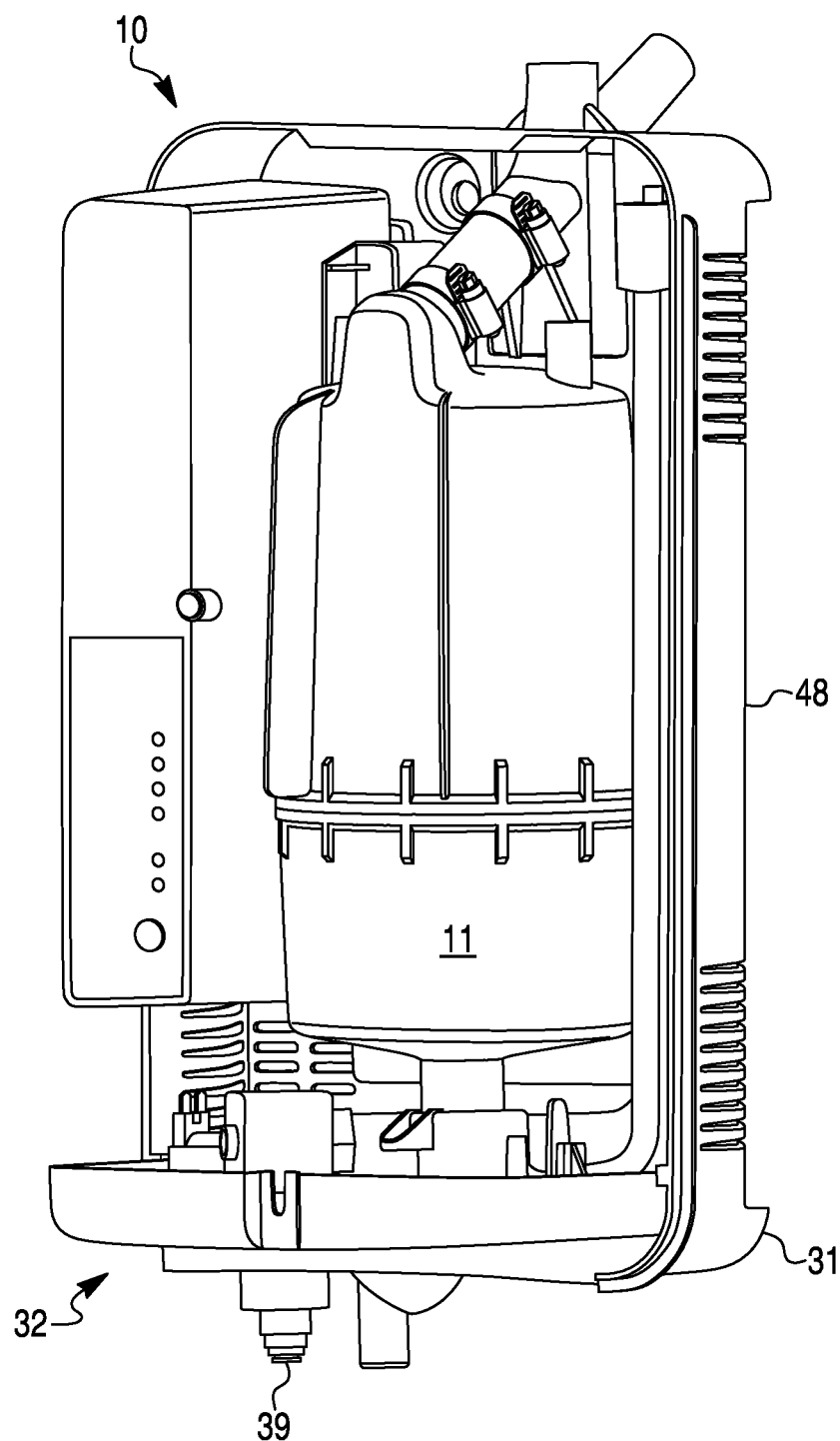
FIG. 12 is a diagram of another perspective view of the humidifier in FIG. 11.

A present approach may include a spout 36 as in FIG. 10, and of humidifier 10 in FIG. 11. Here, manifold 46 may turn through enough angle in order to get a cartridge inclination during a replacement of cartridge 35, 11, and at the same time a steam outlet 36 may have a sufficient angle in order to be installed directly with a flexible hose that connects to a nozzle. The approach may include an O-ring 37 (FIG. 10) in inlet 41 to seal the attachment. Thus, any problem in O-ring 37 may be solved with a cartridge change. This approach does not necessarily need extra space (or room) due an inclination in the attachment with rotatable manifold 46, and an angle between the steam outlet and the flexible hose. FIG. 12 is a diagram of another perspective of humidifier 10 in FIG. 11.

The performance of an electrode humidifier may have a huge dependence on water conductivity because it might be necessary for electric current to flow through the water between the electrodes. An electrode humidifier cartridge may have pre-salt for improving a quickness of a start-up in low conductivity waters.

Even if the device is able to operate with the most potable waters available in North America, an operation with ordinary potable water may reduce the humidifier efficiency and also the time to an initial boiling of water in a cartridge may be longer than desired.

An electrode steam humidifier may have an increase of optimal operation with an improved and large range of water conductivities at a minimum extra cost. A pre-salt situation may aid in achieving such objectives.

The present system may have a tablet of salt placed in the trap during manufacturing process and assembly of the cylinder (after installing the strainer at the bottom of the cylinder to form the trap in the water inlet/outlet of the cylinder). In this manner, the installation does not necessarily require any extra step by the contractor.

Figure 12A:
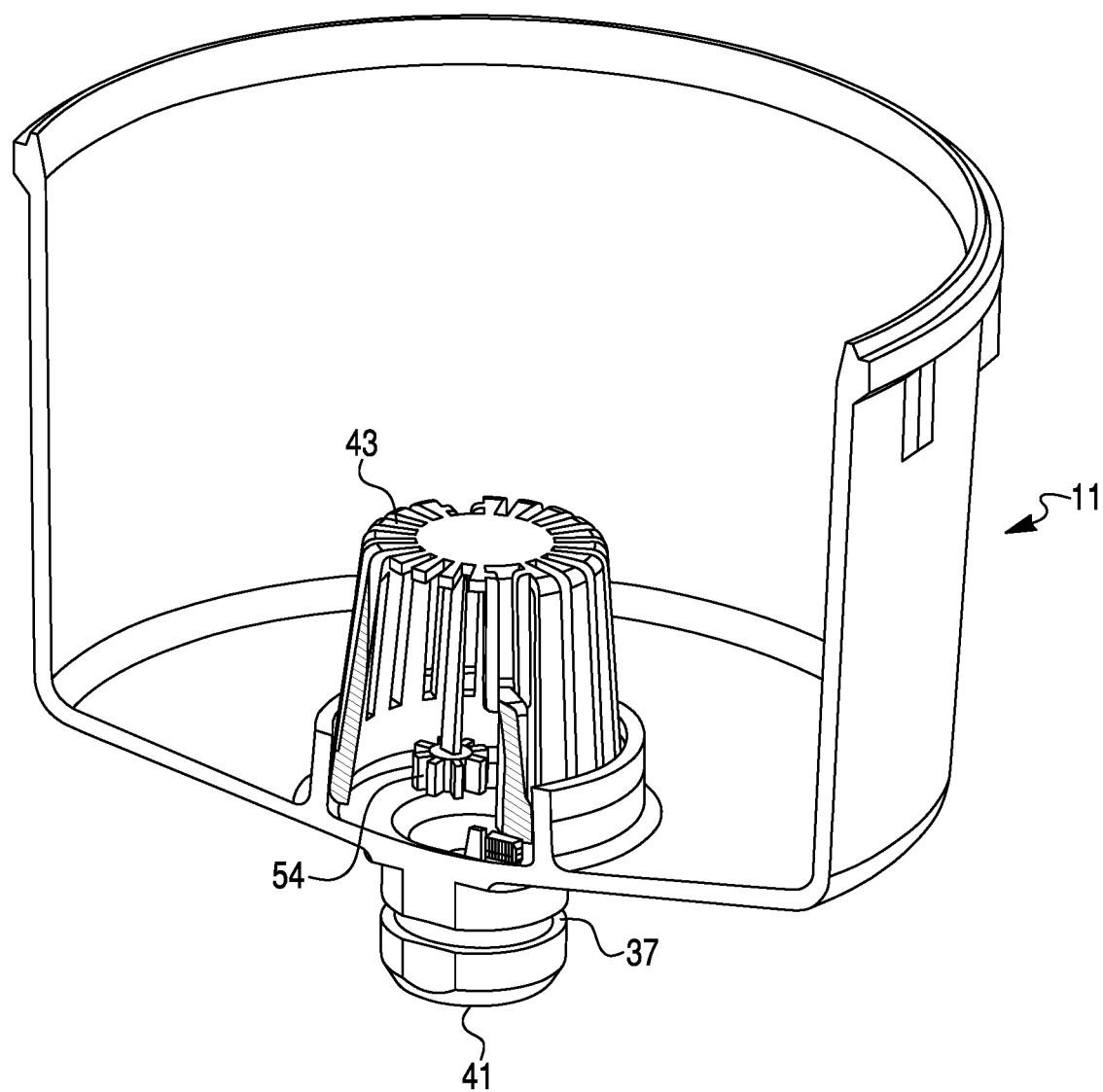
FIG. 12*a* is a diagram of a trap for holding a tablet.

Electrode steam humidifiers may increase the optimal operation of the device with an improved and large range of water conductivity with a minimum cost. The present electrode steam humidifier may contain a pre-salt cartridge 11 as shown in FIG. 12a.

One possible solution, relative to cylinder or cartridge 11, may be a release of a saline liquid directly in a steam outlet 12 of cylinder 11 during the installation process or a tablet of salt; however, this solution may require the extra step for the contractor work, and there is the possibility to forget adding the solution or tablet in the cylinder; moreover, in the case of the liquid, the solution may be limited to only the first boiling cycle or cycles, and with the salt tablet having an uncertainty of the tablet position after it has been added.

This solution may involve an installation of a tablet of salt during a manufacturing process and assembly of cylinder 11, more precisely after the installation the strainer at the water inlet/outlet of cylinder 11. In this manner, the installation does not necessarily require any extra step by a contractor. The contractor may only need to choose the correct cartridge (with or without pre-salt) depending on water conductivity (previously known) without an aid of an extra step.

A trap 43 may be designed combining the cylinder 11 bottom and a strainer geometry to retain a salt tablet 54 with a common standard size and/or shape in order to maintain this position and consistency during fill/drain valve operations. Alternatively, a unique size or sizes and shape or shapes may be incorporated in a salt tablet or tablets 54 used in the present humidifier.

The present approach may include handle or handles 38 molded in the front of cartridge 35, 11 as in FIGS. 10 and 11, for easy handling during an installation process. The angle selected in the steam outlet does not necessarily affect a condensation return and the device performance. The geometry in electrodes 12 and 13 may have a poke yoke design to avoid the wrong installation with, for instance, level sensor 26.

Figure 13A:
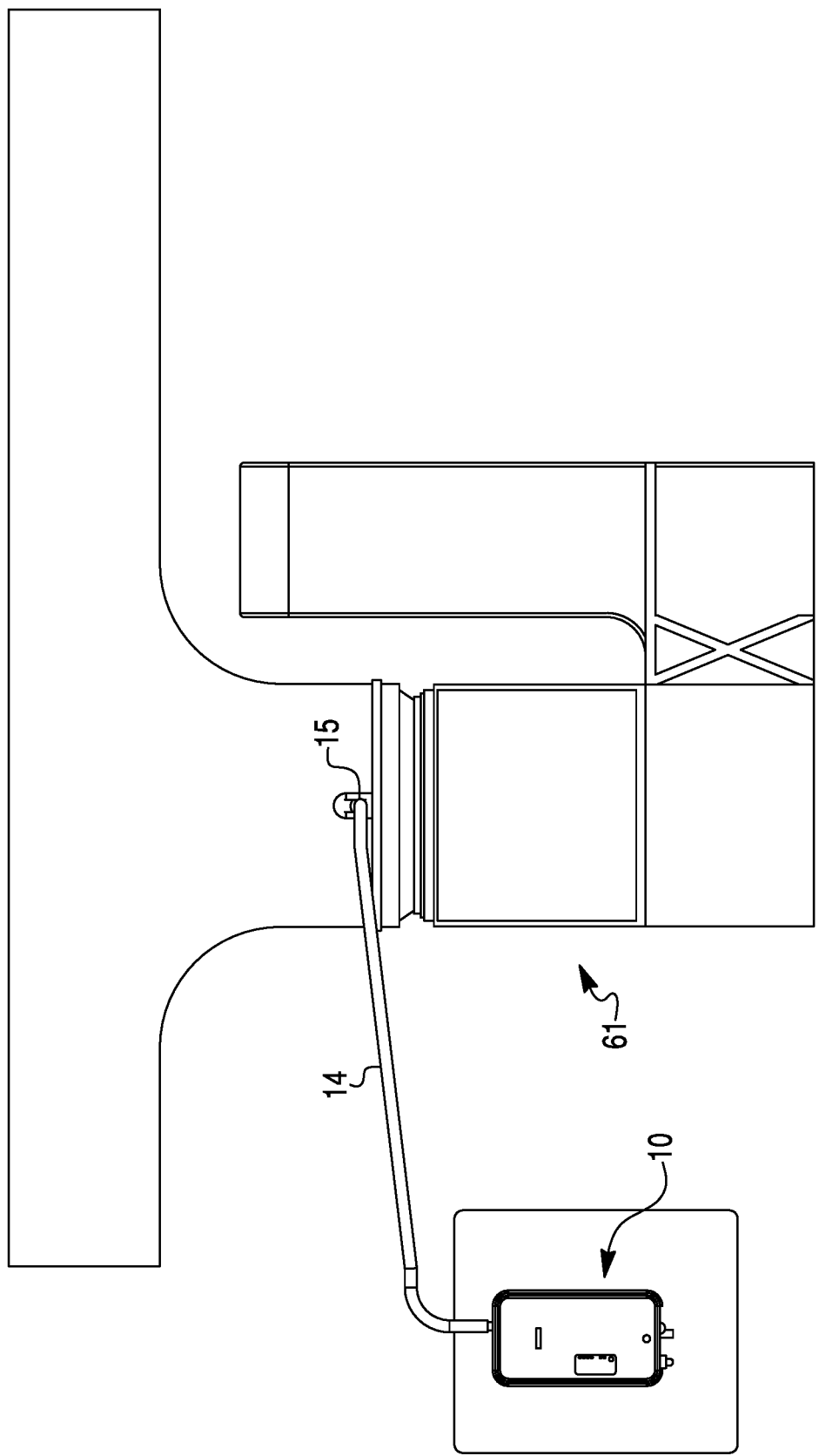
Figure 13B:
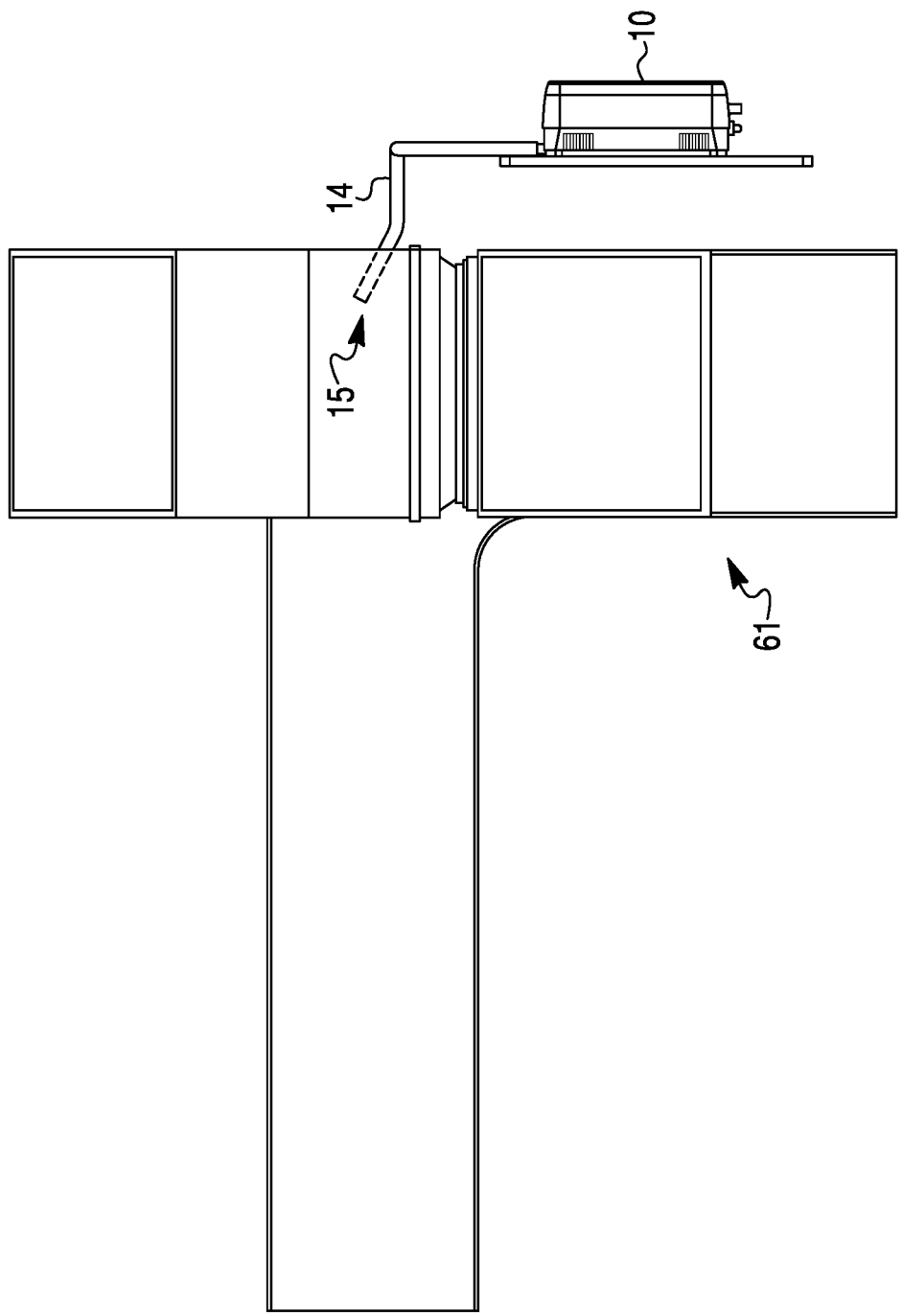

FIG. 13a is a diagram of a humidifier 10 having a hose 14 connected from the humidifier to a nozzle 15 in a duct 61. FIG. 13b is a diagram of a side view of humidifier 10 and duct 61 showing the hose 14 connection to nozzle 15 in duct 61. FIG. 13c is a diagram showing a perspective view of humidifier 10, hose 14 and duct 61.

Figure 14A:
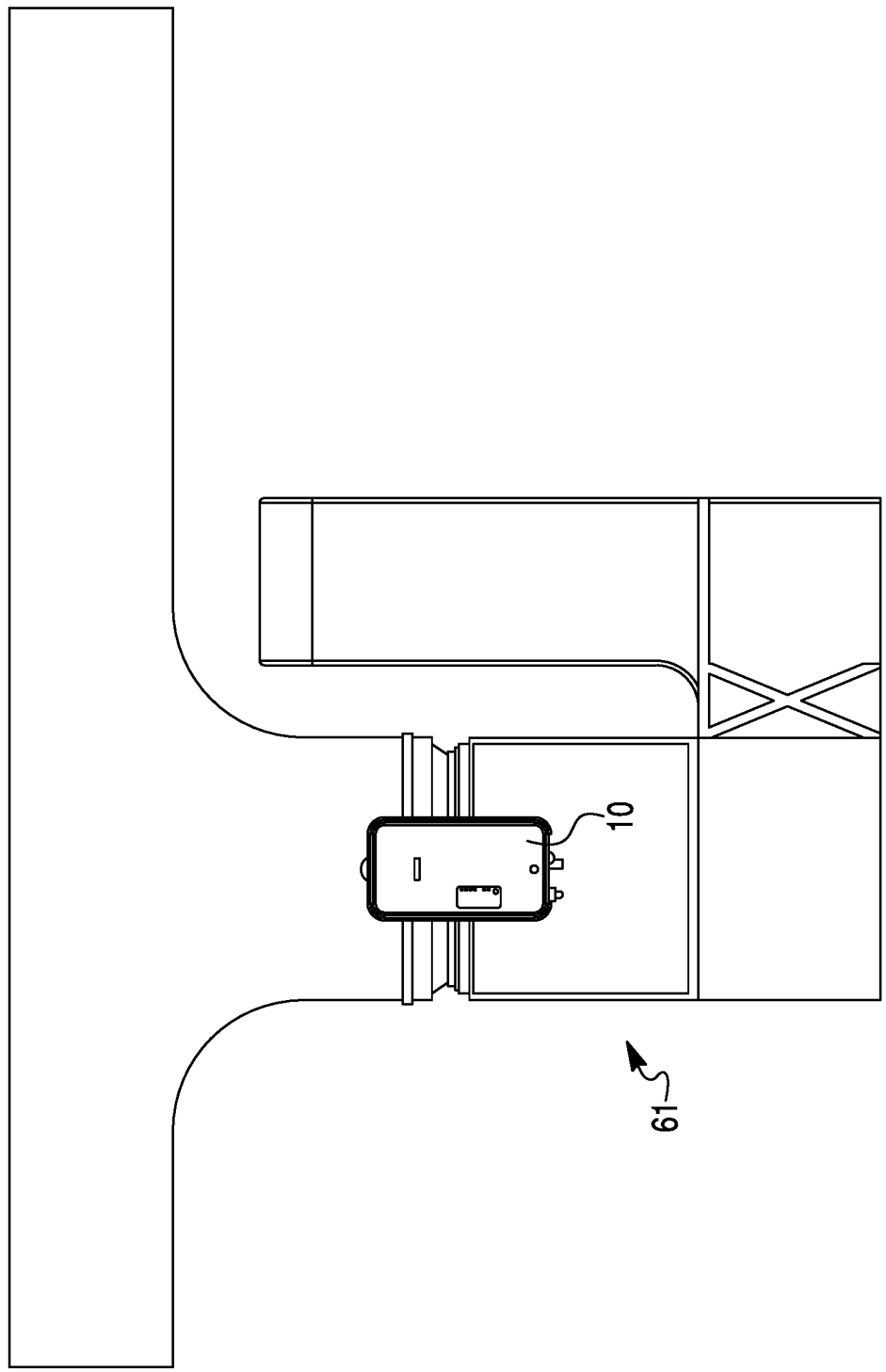
Figure 14B:
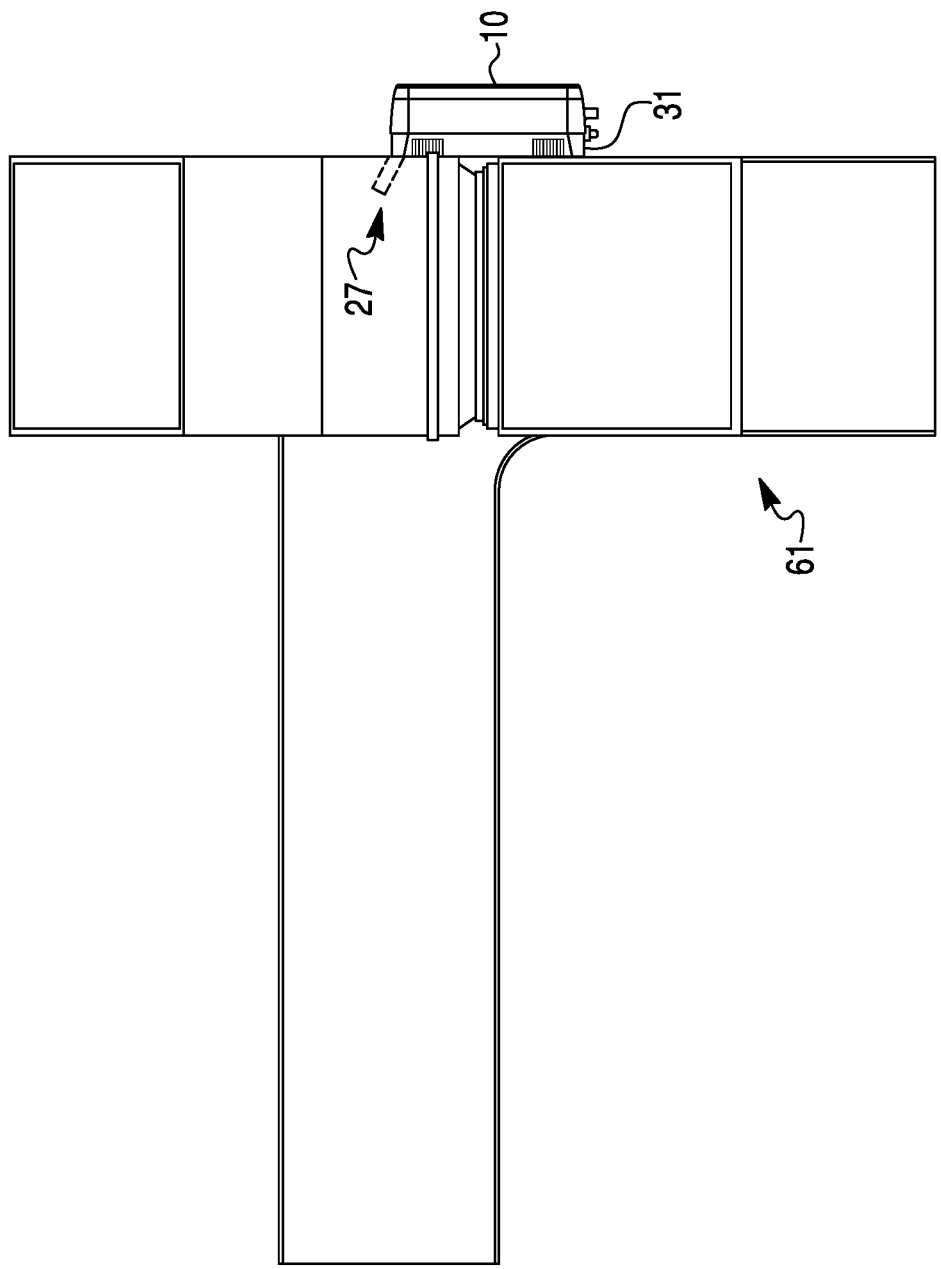

FIG. 14a is a diagram of humidifier 10 attached to duct 61 and having a direct nozzle 15 in duct 61. FIG. 14b is a diagram of a side view of humidifier 10 showing a direct nozzle 15 in duct 61. FIG. 14c is a diagram of a perspective view humidifier 10 and duct 61 with the direct nozzle approach. Duct 61 in FIGS. 13a, 13b and 13c and FIGS. 14a, 14b and 14c, has a vertical orientation but may instead have a horizontal orientation, or an orientation at another angle.

To recap, a configurable electrode steam humidifier may incorporate a housing, a cartridge situated in the housing, a reconfigurable steam nozzle connected within the housing via a hose to an output of the cartridge, a manifold situated in the housing and having a fluid connection to an input to the cartridge, a drain valve connected via a hose to the manifold, and a fill valve connected via hose to the manifold. The manifold may be rotatable relative to the housing.

The reconfigurable steam nozzle may incorporate one of two or more configurations for mounting a nozzle.

The two or more configurations for mounting a steam nozzle may be selected from a group comprising at least a direct mounting and a remote mounting.

The direct mounting configuration may have a steam nozzle connected via a hose to the output of the cartridge and the steam nozzle may protrude out of the housing, and be inserted directly into an air duct. The remote mounting configuration may have a steam nozzle connected via a hose to the output of the cartridge and the steam nozzle may protrude out of the housing, and be connected with a hose to another steam nozzle situated in an air duct.

The housing may incorporate a back cover having one or more standoffs on the back cover, which may be mounted to the duct with the direct mounting configuration using a corresponding steam nozzle, to ensure a lack of interference between the back cover and any part of the duct, and to assure a minimization of heat transfer between the duct and back cover.

The cartridge may further incorporate an O-ring on the input of the cartridge that seals the fluid connection between the input of the cartridge and the manifold, and have one or more handles on the cartridge.

A procedure for removing the cartridge may incorporate removing a front cover from the housing; disconnecting the output of the cartridge from the reconfigurable nozzle; grabbing the cartridge by the one or more handles, as needed, that are attached to the cartridge; tilting the cartridge at the output away from the housing, which may rotate the manifold at the input of the cartridge relative to the housing due to a rigidity of the fluid connection of the manifold to the input to the cartridge, the manifold being attached to the housing; and pulling on the cartridge to disconnect the fluid connection of the input of the cartridge to the manifold, and to remove the cartridge from the housing.

A procedure for inserting a replacement cartridge or the same cartridge, may incorporate inserting the cartridge at an angle so that the input of the cartridge fits into the manifold that is rotated relative to the housing, to achieve an alignment and a fluid connection of the output of the cartridge with the manifold; tilting the cartridge at the output, into the housing along with a rotation of the manifold that stays aligned with the input of the cartridge; and connecting the output of the cartridge via a hose to the reconfigurable nozzle.

Replacing the cartridge may incorporate replacing the O-ring when an O-ring is installed on the output of a replacement cartridge.

An approach for assembling an electrode steam humidifier, may incorporate inserting a cartridge, having a water tank with electrodes, into a housing; connecting an input port of the cartridge to a first port of a manifold; connecting a fill valve between a fill cup and a second port of the manifold; connecting a drain valve between a drain and a third port in the manifold; attaching the manifold to the housing with a rotatable joint; and connecting an outlet of the cartridge to a configurable steam nozzle to be situated in a duct, as a direct inject, or as remote connection with a hose from the outlet of the cartridge to the steam nozzle to be situated in the duct.

The manifold may be rotated relative to the housing for aligning the first port of a manifold to the input port of the cartridge while inserting the cartridge at an angle.

The fill valve and the drain valve may be either a double solenoid valve mechanism or single solenoid valve mechanisms.

An electrode humidifier system may incorporate a water holding cartridge having two or more electrodes situated inside the cartridge, a configurable steam nozzle connected to an output of the cartridge, a manifold connected to an input of the cartridge, a fill valve connected to the manifold, a drain valve connected to the manifold, a water level sensor situated in the cartridge, and a controller connected to the fill and drain valves and the level sensor to control a water level at predetermined levels. The configurable steam nozzle may be connectable to the output of the cartridge with or without a hose or pipe for a direct inject or a remote inject into a duct.

The steam nozzle at the output of the cartridge may have a curved shape or a straight shape, for a remote connection or a direct connection, respectively, or have a combination of the straight and curved shapes.

The system may further incorporate a housing encompassing at least the cartridge and the manifold.

The steam nozzle having one end inside of the housing may be connected to the output of the cartridge with a hose.

The manifold may be attached to the housing and be rotatable relative to the housing.

When the cartridge is inserted into or removed from the housing, the cartridge may be tilted while being connected to the manifold because of a rotation of the manifold relative to the housing.

The housing may incorporate one or more stand-offs for a direct mount of the housing relative to a duct.

The input of the cartridge may incorporate an O-ring seal.

A salt tablet may be placed inside of the cartridge to achieve an optimal operation, with a faster start-up particularly in below average water conductivities. The salt tablet may be incorporated by a default configuration of the cartridge in that the salt tablet is placed, during manufacturing process and/or assembly of the cartridge, in a salt trap in the cartridge or directly in the cartridge before an installation of the cartridge in the electrode humidifier system. Thus, an assembler or an installer may not necessarily need to perform an extra step of adding or removing the salt tablet relative to cartridge installation or assembly in the system.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A configurable electrode steam humidifier comprising:
   a housing, wherein the housing includes a drain pan having a drain outlet;
   a cartridge situated in the housing;
   a reconfigurable steam nozzle connected within the housing via a first hose to an output of the cartridge;
   a manifold situated in the housing and having a fluid connection to an input to the cartridge, wherein the manifold is situated in the drain pan;
   a drain valve connected via a second hose to the manifold, wherein the drain valve is situated in the drain pan; and
   a fill valve connected via a third hose to the manifold, wherein the manifold is rotatable relative to the housing, wherein the manifold is configured to rotate relative to the drain pan, and
   wherein the first hose is configured to be installed to connect the first hose to the cartridge.

2. The humidifier of claim 1, wherein the reconfigurable steam nozzle is configured to be mounted in a direct mounting configuration or a remote mounting configuration, and wherein:
   in the direct mounting configuration, the reconfigurable steam nozzle is connected via the first hose to the output of the cartridge and the reconfigurable steam nozzle protrudes out of the housing and is configured to be inserted directly into an air duct,
   in the remote mounting configuration, the reconfigurable steam nozzle is connected via the first hose to the output of the cartridge and the reconfigurable steam nozzle protrudes out of the housing, and is configured to be connected with another hose to another steam nozzle situated in the air duct, and
   the housing comprises a back cover having one or more standoffs on the back cover configured to ensure a lack of interference between the back cover and any part of the air duct and to limit heat transfer between the duct and back cover when the housing is mounted to the air duct in the direct mounting configuration.

3. The humidifier of claim 1, wherein the cartridge comprises an O-ring on the input of the cartridge, the O-ring being configured to seal the fluid connection between the input of the cartridge and the manifold.

4. The humidifier of claim 3, wherein the O-ring is installed on the output of the cartridge.

5. The humidifier of claim 1, wherein the manifold is attached to the housing with a rotatable joint configured to cause the manifold to rotate relative to the housing when the cartridge is tilted away from the housing.

6. The humidifier of claim 1, wherein the third hose is configured to permit rotation of the manifold relative to the housing when the third hose connects the fill valve and the manifold.

7. The humidifier of claim 1, wherein:
   the output of the cartridge is configured to disconnect from the first hose; and
   the cartridge is tiltable away from the housing when the output of the cartridge is disconnected from the first hose.

8. The humidifier of claim 1, wherein the input of the cartridge is configured to be separable from the manifold.

9. The humidifier of claim 1, wherein the manifold is configured to rotate relative to the housing when the cartridge rotates relative to the housing.

10. The humidifier of claim 1, wherein the housing includes a front cover configured to be removable from the housing.

11. The humidifier of claim 1, wherein the cartridge comprises a water tank and an electrode, wherein the electrode is configured to heat water in the water tank.

12. The humidifier of claim 1, further comprising a controller and a level sensor,
   wherein the controller is connected to the level sensor,
   wherein the level sensor is configured to indicate a water level in the cartridge to the controller, and
   wherein the controller is configured to control the water level in the cartridge at predetermined levels.

13. The humidifier of claim 12, wherein the controller is connected to the drain valve and the fill valve.

14. The humidifier of claim 1, wherein the drain valve and the fill valve are situated in the housing.

15. The humidifier of claim 1, wherein the cartridge includes a salt cartridge configured to hold a salt tablet.

16. The humidifier of claim 1, wherein the reconfigurable steam nozzle is configured to protrude out of the housing and insert directly into an air duct.

17. The humidifier of claim 1, wherein the reconfigurable steam nozzle is configured to protrude out of the housing, and where the reconfigurable steam nozzle is configured to be connectable with another hose connected to another steam nozzle in an air duct.

\* \* \* \* \*